(12) United States Patent
Pratt, Jr. et al.

(10) Patent No.: US 8,169,974 B2
(45) Date of Patent: May 1, 2012

(54) SUSPENDING TRANSMISSIONS IN A WIRELESS NETWORK

(75) Inventors: Wallace A. Pratt, Jr., Pflugerville, TX (US); Mark J. Nixon, Round Rock, TX (US); Eric D. Rotvold, West St. Paul, MN (US); Robin S. Pramanik, Karlsruhe (DE); Tomas P. Lennvall, Vasteras (SE)

(73) Assignee: Hart Communication Foundation, Austin, TX (US)

( * ) Notice: Subject to any disclaimer, the term of this patent is extended or adjusted under 35 U.S.C. 154(b) by 1056 days.

(21) Appl. No.: 12/101,011

(22) Filed: Apr. 10, 2008

(65) Prior Publication Data
US 2008/0273518 A1  Nov. 6, 2008

Related U.S. Application Data

(60) Provisional application No. 60/911,795, filed on Apr. 13, 2007.

(51) Int. Cl.
*H04W 4/00* (2009.01)
*H04J 3/14* (2006.01)
*H04J 3/00* (2006.01)
*H04J 3/06* (2006.01)

(52) U.S. Cl. ........ 370/332; 370/225; 370/228; 370/280; 370/509; 370/519

(58) Field of Classification Search ........................ None
See application file for complete search history.

(56) References Cited

U.S. PATENT DOCUMENTS

| | | | |
|---|---|---|---|
| 4,792,944 A * | 12/1988 | Takahashi et al. | 370/458 |
| 5,159,592 A | 10/1992 | Perkins | |
| 5,719,859 A * | 2/1998 | Kobayashi et al. | 370/347 |
| 6,198,751 B1 | 3/2001 | Dorsey et al. | |
| 6,236,334 B1 | 5/2001 | Tapperson et al. | |
| 6,298,377 B1 | 10/2001 | Hartikainen et al. | |
| 6,578,047 B1 | 6/2003 | Deguchi | |
| 6,594,530 B1 | 7/2003 | Glanzer et al. | |

(Continued)

FOREIGN PATENT DOCUMENTS

GB  2 403 043 A  12/2004

(Continued)

OTHER PUBLICATIONS

International Search Report and Written Opinion for corresponding International Application No. PCT/US08/04751 (Apr. 15, 2009).

(Continued)

*Primary Examiner* — Donald Mills
*Assistant Examiner* — Samina Choudhry
(74) *Attorney, Agent, or Firm* — Marshall, Gerstein & Borun LLP

(57) ABSTRACT

A method of increasing operational safety of a wireless communication network operating in a process control environment and having a plurality of network devices includes detecting a first triggering condition associated with an increased operational risk due to a wireless transmissions by at least one of the plurality of network devices, sending a suspend command to at least some of the plurality of network devices, suspending transmissions at the at least some of the plurality of network devices; and resuming transmissions at the at least some of the plurality of network devices upon occurrence of a second triggering condition.

22 Claims, 8 Drawing Sheets

U.S. PATENT DOCUMENTS

| | | | |
|---|---|---|---|
| 6,801,777 B2 | 10/2004 | Rusch | |
| 6,891,838 B1 | 5/2005 | Petite et al. | |
| 6,920,171 B2 | 7/2005 | Souissi et al. | |
| 6,959,356 B2 | 10/2005 | Packwood et al. | |
| 6,970,909 B2 | 11/2005 | Schulzrinne | |
| 6,996,100 B1 | 2/2006 | Haartsen | |
| 7,110,380 B2 | 9/2006 | Shvodian | |
| 7,292,246 B2 | 11/2007 | Goldschmidt | |
| 7,375,594 B1 | 5/2008 | Lemkin et al. | |
| 7,420,980 B1 | 9/2008 | Pister et al. | |
| 7,529,217 B2 | 5/2009 | Pister et al. | |
| 7,602,741 B2 | 10/2009 | Tapperson et al. | |
| 7,675,935 B2 | 3/2010 | Samudrala et al. | |
| 7,680,033 B1* | 3/2010 | Khan et al. | 370/225 |
| 7,848,827 B2 | 12/2010 | Chen | |
| 7,853,221 B2 | 12/2010 | Rodriguez et al. | |
| 2001/0030957 A1 | 10/2001 | McCann et al. | |
| 2001/0041591 A1 | 11/2001 | Carroll | |
| 2002/0007414 A1 | 1/2002 | Inoue et al. | |
| 2002/0067693 A1 | 6/2002 | Kodialam et al. | |
| 2002/0111169 A1 | 8/2002 | Vanghi | |
| 2002/0120671 A1 | 8/2002 | Daffner et al. | |
| 2003/0014535 A1 | 1/2003 | Mora | |
| 2003/0026268 A1 | 2/2003 | Navas | |
| 2003/0040897 A1 | 2/2003 | Murphy et al. | |
| 2003/0169722 A1 | 9/2003 | Petrus et al. | |
| 2003/0198220 A1 | 10/2003 | Gross et al. | |
| 2003/0236579 A1 | 12/2003 | Hauhia et al. | |
| 2004/0028023 A1 | 2/2004 | Mandhyan et al. | |
| 2004/0053600 A1 | 3/2004 | Chow et al. | |
| 2004/0095745 A1 | 5/2004 | Park | |
| 2004/0117497 A1 | 6/2004 | Park | |
| 2004/0148135 A1 | 7/2004 | Balakrishnan et al. | |
| 2004/0174904 A1 | 9/2004 | Kim et al. | |
| 2004/0203973 A1* | 10/2004 | Khan | 455/517 |
| 2004/0257995 A1 | 12/2004 | Sandy et al. | |
| 2004/0259533 A1 | 12/2004 | Nixon et al. | |
| 2005/0013253 A1 | 1/2005 | Lindskog et al. | |
| 2005/0018643 A1 | 1/2005 | Neilson et al. | |
| 2005/0025129 A1 | 2/2005 | Meier | |
| 2005/0030968 A1 | 2/2005 | Rich et al. | |
| 2005/0049727 A1 | 3/2005 | Tapperson et al. | |
| 2005/0078672 A1 | 4/2005 | Caliskan et al. | |
| 2005/0085928 A1 | 4/2005 | Shani | |
| 2005/0114517 A1 | 5/2005 | Maffeis | |
| 2005/0125085 A1 | 6/2005 | Prasad et al. | |
| 2005/0160138 A1 | 7/2005 | Ishidoshiro | |
| 2005/0164684 A1 | 7/2005 | Chen et al. | |
| 2005/0190712 A1* | 9/2005 | Lee et al. | 370/312 |
| 2005/0192037 A1 | 9/2005 | Nanda et al. | |
| 2005/0213612 A1 | 9/2005 | Pister et al. | |
| 2005/0228509 A1 | 10/2005 | James | |
| 2005/0239413 A1* | 10/2005 | Wiberg et al. | 455/69 |
| 2005/0249137 A1 | 11/2005 | Todd et al. | |
| 2005/0276233 A1 | 12/2005 | Shepard et al. | |
| 2005/0282494 A1 | 12/2005 | Kossi et al. | |
| 2006/0007927 A1 | 1/2006 | Lee et al. | |
| 2006/0029060 A1 | 2/2006 | Pister | |
| 2006/0029061 A1 | 2/2006 | Pister et al. | |
| 2006/0045016 A1 | 3/2006 | Dawdy et al. | |
| 2006/0062192 A1 | 3/2006 | Payne | |
| 2006/0067280 A1 | 3/2006 | Howard et al. | |
| 2006/0077917 A1 | 4/2006 | Brahmajosyula et al. | |
| 2006/0120384 A1 | 6/2006 | Boutboul et al. | |
| 2006/0174017 A1 | 8/2006 | Robertson | |
| 2006/0182076 A1 | 8/2006 | Wang | |
| 2006/0213612 A1 | 9/2006 | Perron et al. | |
| 2006/0215582 A1 | 9/2006 | Castagnoli et al. | |
| 2006/0245440 A1 | 11/2006 | Mizukoshi | |
| 2006/0253584 A1 | 11/2006 | Dixon et al. | |
| 2007/0016724 A1 | 1/2007 | Gaither et al. | |
| 2007/0070943 A1 | 3/2007 | Livet et al. | |
| 2007/0074489 A1 | 4/2007 | Erhardt et al. | |
| 2007/0076600 A1 | 4/2007 | Ekl et al. | |
| 2007/0078995 A1 | 4/2007 | Benard et al. | |
| 2007/0109592 A1 | 5/2007 | Parvathaneni et al. | |
| 2007/0118604 A1 | 5/2007 | Costa Requena | |
| 2007/0121531 A1 | 5/2007 | Lee et al. | |
| 2007/0140245 A1 | 6/2007 | Anjum et al. | |
| 2007/0143392 A1 | 6/2007 | Choe et al. | |
| 2007/0161371 A1 | 7/2007 | Dobrowski et al. | |
| 2007/0237094 A1 | 10/2007 | Bi et al. | |
| 2007/0243879 A1 | 10/2007 | Park et al. | |
| 2007/0280144 A1 | 12/2007 | Hodson et al. | |
| 2007/0280286 A1 | 12/2007 | Hodson et al. | |
| 2007/0282463 A1 | 12/2007 | Hodson et al. | |
| 2007/0283030 A1 | 12/2007 | Deininger et al. | |
| 2008/0075007 A1 | 3/2008 | Mehta et al. | |
| 2008/0082636 A1 | 4/2008 | Hofmann et al. | |
| 2008/0084852 A1 | 4/2008 | Karschnia | |
| 2008/0098226 A1 | 4/2008 | Zokumasui | |
| 2008/0117836 A1 | 5/2008 | Savoor et al. | |
| 2008/0120676 A1 | 5/2008 | Morad et al. | |
| 2008/0148296 A1 | 6/2008 | Chen et al. | |
| 2008/0198860 A1 | 8/2008 | Jain et al. | |
| 2008/0215773 A1 | 9/2008 | Christison et al. | |
| 2008/0285582 A1 | 11/2008 | Pister | |
| 2009/0059855 A1 | 3/2009 | Nanda et al. | |
| 2009/0097502 A1 | 4/2009 | Yamamoto | |
| 2009/0154481 A1 | 6/2009 | Han et al. | |

FOREIGN PATENT DOCUMENTS

| | | |
|---|---|---|
| JP | 2005143001 | 6/2005 |
| KR | 1020010076781 | 8/2001 |
| KR | 1020040048245 | 6/2004 |
| KR | 1020050028737 | 3/2005 |
| KR | 1020060066580 | 6/2006 |
| KR | 1020050016891 | 9/2006 |
| KR | 1020060111318 | 10/2006 |
| KR | 102007002660 | 3/2007 |
| WO | WO-02/05199 A1 | 1/2002 |
| WO | WO-2005079026 A1 | 8/2005 |
| WO | WO-2005/096722 A2 | 10/2005 |
| WO | WO-2006121114 A1 | 11/2006 |

OTHER PUBLICATIONS

Qu et al., "A web-enabled distributed control application platform for industrial automation", Emerging Technologies and Factory Automation, Proceedings, 2:129-32 (Sep. 16, 2003).

Supplementary European Search Report for corresponding European application No. EP08826492 (Jun. 2, 2010).

Zheng, "ZigBee wireless sensor network in industrial applications", SICE-ICCAS 2006 International Joint Conference, IEEE, New Jersey, pp. 1067-1070 (Oct. 1, 2006).

International Preliminary Report on Patentability from corresponding International Application No. PCT/US08/04751 (Oct. 13, 2009).

Wong, "A Fuzzy-Decision-Based Routing Protocol for Mobile Ad Hoc Networks," Networks, 2002. ICON 2002. 10th IEEE International Conference on Aug. 27-30, 2002, Piscataway, NJ, USA, IEEE, Aug. 27, 2002, pp. 317-322.

Alandjani et al., "Fuzzy Routing in Ad Hoc Networks," Conference Proceedings fo the 2003 IEEE International Performance, Computing, and Communications Conference. Phoenix, AZ, Apr. 9-11, 2003, IEEE, vol. Conf. 22, Apr. 9, 2003, pp. 525-530.

Thomas et al., "Anthoc—QoS: Quality of 1-7 Service Routing in Mobile Ad Hoc Networks Using Swarm Intelligence" Mobile Technology, Applications and Systems, 2005 2nd International Conference on Guangzhou, China Nov. 15-17, 2005, Piscathaway, NJ, USA, IEEE, Piscathaway, NJ, USA Nov. 15, 2005, pp. 1-8.

Kastner et al., "Communication Systems for Building Automation and Control," Proceedings of the IEEE, vol. 93, No. 6, Jun. 1, 2005, pp. 1178-1203.

Thomesse, J., "Fieldbus Technology in Industrial Automation," Proceedings of the IEEE, vol. 93, No. 6, Jun. 1, 2005, pp. 1073-1101.

Cleveland, F., "IEC TC57 Security Standards for the Power System's Information Infrastructure—Beyond Simple Encryption," May 21, 2006, pp. 1079-1087.

Matkurbanov et al., "A Survey and Analysis of Wireless Fieldbus for Industrial Environments," SICE-ICCAS 2006 International Joint Conference, 5555-5561 (2006).

Lopez et al., "Wireless communications deployment in industry: a review of issues, options and technologies," Computers in Industry, Elsevier Science, 56:29-53 (2005).

Shen et al., "Wireless Sensor Networks for Industrial Applications," WCICA, 15-19 (2004).

"A Survey and Analysis of Wireless Field bus for Industrial Environments", Pulat Matkurbanov, SeungKi Lee, Dong-Sung Kim; Dept. of Electron. Eng., Kumoh Nat. Inst. of Technol., Gumi. This paper appears in: SICE-ICASE, 2006. International Joint Conference: Issue Date: Oct. 18-21, 2006, on pp. 55555-55561; Print ISBN: 89-950038-4-7.

"D1100 SmartMesh Network Release 1.0 Engineering Software Specifications," Dust Networks, Dec. 17, 2011, 36 pages.

"D1100 SmartMesh Network Release 1.0 Engineering Software Specifications," Dust Networks, 36 pages.

"Multiple Interpenetrating MultiDiGraphs," Dust Incorporated, 12 pages. (Powerpoint).

"SmartMesh-XT CLI Commands Guide," Dust Networks, Inc., Jun. 27, 2007, 36 pages.

SmartMesh-XT KT1030/KT2135/KT2030 Evaluation Kit Guide, Dust Networks, Inc., Nov. 2, 2007, 58 pages.

"SmartMesh-XT M2135-2, M2030-2 2.4 GHz Wireless Analog/Digital/Serial Motes," Dust Networks, Inc., Mar. 28, 2007, 33 pages.

SmartMesh-XT Manager XML API Guide, Dust Networks, Inc., Apr. 4, 2007, 148 pages.

"System Description for Security Review SmartMesh Alba," Dust Networks, 36 pages.

Berlemann, Software Defined Protocols Based on Generic Protocol Functions for Wired and Wireless Networks, Nov, 2033, RWTH Aachen University.

Willig (ed.), "An architecture for wireless extension of PROFIBUS", IECON 2003—Proceedings of the 29th Annual Conference of the IEEE Industrial Electronics Society, New York, vol. 3, pp. 2369-2375 (Nov. 2-6, 2003).

* cited by examiner

FIG. 7

SUSPENDING TRANSMISSIONS IN A WIRELESS NETWORK

CROSS-REFERENCE TO RELATED APPLICATIONS

This application claims benefit of the U.S. Provisional Application No. 60/911,795, entitled "Routing, Scheduling, Reliable and Secure Operations in a Wireless Communication Protocol" filed Apr. 13, 2007, the disclosure of which is hereby expressly incorporated herein by reference.

FIELD OF TECHNOLOGY

The present invention relates generally to wireless communications and, more particularly, to temporarily suspending communications in a wireless network for safety and other purposes.

BACKGROUND

It is known to use standardized communication protocols in the process control industry to enable devices made by different manufacturers to communicate with one another in an easy to use and implement manner. One such well known communication standard used in the process control industry is the Highway Addressable Remote Transmitter (HART) Communication Foundation protocol, referred to generally as the HART protocol. Generally speaking, the HART protocol supports a combined digital and analog signal on a dedicated wire or set of wires, in which on-line process signals (such as control signals, sensor measurements, etc.) are provided as an analog current signal (e.g., ranging from 4 to 20 milliamps) and in which other signals, such as device data, requests for device data, configuration data, alarm and event data, etc., are provided as digital signals superimposed or multiplexed onto the same wire or set of wires as the analog signal. However, the HART protocol currently requires the use of dedicated, hardwired communication lines, resulting in significant wiring needs within a process plant.

There has been a move, in the past number of years, to incorporate wireless technology into various industries including, in some limited manner, the process control industry. However, there are significant hurdles in the process control industry that limit the full scale incorporation, acceptance and use of wireless technology. In particular, the process control industry requires a completely reliable process control network because loss of signals can result in the loss of control of a plant, leading to catastrophic consequences, including explosions, the release of deadly chemicals or gases, etc. For example, Tapperson et al., U.S. Pat. No. 6,236,334 discloses the use of a wireless communications in the process control industry as a secondary or backup communication path or for use in sending non-critical or redundant communication signals. Moreover, there have been many advances in the use of wireless communication systems in general that may be applicable to the process control industry, but which have not yet been applied to the process control industry in a manner that allows or provides a reliable, and in some instances completely wireless, communication network within a process plant. U.S. Patent Application Publication Numbers 2005/0213612, 2006/0029060 and 2006/0029061 for example disclose various aspects of wireless communication technology related to a general wireless communication system.

One factor significantly inhibiting the development and application of wireless communications in the process control industry is the difficulty of retrofitting legacy devices for the use with wireless communication networks. In some cases, devices cannot be retrofitted at all and need to be replaced with newer, wireless-ready models. Moreover, many of the supporting installations are similarly rendered obsolete by a transition to wireless communications. In other words, wireless networks cannot easily extend wired networks. An additional challenge particularly pertinent to the process control industry is the high cost of the existing wired installations and the understandable reluctance of the operators to completely replace the wired infrastructure with a wireless infrastructure. Meanwhile, wireless networks typically require stationary antennas or access points to transmit and receive radio signals and may therefore require an expensive infrastructure which makes the transition to wireless communications less desirable. Thus, while some operators may recognize the advantages of a wireless approach to process measurement and control, many may be unwilling to dismantle the existing installations, decommission the wired devices which may be fully operational, and purchase wireless devices.

Another factor contributing to the slower than expected proliferation of wireless standards in the process control industry is the impact on a user, such as a technician or an operator of a process control system. During operation of a typical process control system, users may remotely access individual devices for the purposes of configuring, monitoring, and controlling various functions of the devices. For example, to enable access and exchange of information over the HART protocol, devices are assigned unique addresses according to a predefined addressing scheme. Users and the software applications developed for operators and technicians in the process control industry have come to rely on an efficient addressing scheme which cannot be supported by the available wireless standards. Thus, a transition to a wireless standard in a process control industry is widely expected to entail adopting a new addressing scheme, updating the corresponding software applications and providing additional training to the personnel.

Additionally, some of the existing wireless standards, such as the IEEE 802.11(x) WLAN, for example, do not satisfy all of the demands of the process control industry. For example, devices communicate both process and control data which may typically have different propagation delay constraints. In general, some of the critical data exchanged in the process control industry may require efficient, reliable and timely delivery which cannot always be guaranteed by the existing wireless protocols. Moreover, because some of the modules used in the process control industry are used to control very sensitive and potentially dangerous process activities, wireless standards suitable for this industry need to provide redundancy in communication paths not readily available in the known wireless networks. Finally, some process control devices may be sensitive to high power radio signals and may require radio transmissions to be limited or held at a well controlled power level. Meanwhile, the available wireless standards typically rely on antennas or access points which transmit relatively strong signals to cover large geographic areas.

Similar to wired communication protocols, wireless communication protocols are expected to provide efficient, reliable and secure methods of exchanging information. Of course, much of the methodology developed to address these concerns on wired networks does not apply to wireless communications because of the shared and open nature of the medium. Further, in addition to the typical objectives behind a wired communication protocol, wireless protocols face other requirements with respect to the issues of interference and co-existence of several networks that use the same part of the radio frequency spectrum. To complicate matters, some wireless networks operate in the part of the spectrum that is unlicensed, or open to the public. Therefore, protocols servicing such networks must be capable of detecting and resolving issues related to frequency (channel) contention, radio resource sharing and negotiation, etc.

In the process control industry, developers of wireless communication protocols face additional challenges, such as achieving backward compatibility with wired devices, supporting previous wired versions of a protocol, providing transition services to devices retrofitted with wireless communicators, and providing routing techniques which can ensure both reliability and efficiency. Meanwhile, there remains a wide number of process control applications in which there are few, if any, in-place measurements. Currently these applications rely on observed measurements (e.g. water level is rising) or inspection (e.g. period maintenance of air conditioning unit, pump, fan, etc.) to discover abnormal situations. In order to take action, operators frequently require face-to-face discussions. Many of these applications could be greatly simplified if measurement and control devices were utilized. However, current measurement devices usually require power, communications infrastructure, configuration, and support infrastructure which simply is not available.

In another aspect, the process control industry requires that the communication protocol servicing a particular process control network be able to accommodate field devices with different data transmission requirements, priorities, and power capabilities. In particular, some process control systems may include measurement devices that frequently (such as several times per second) report measurements to a centralized controller or to another field device. Meanwhile, another device in the same system may report measurements, alarms, or other data only once per hour. However, both devices may require that the respective measurement reports propagate to a destination host, such as a controller, a workstation, or a peer field device, with as little overhead in time and bandwidth as possible.

Further, some applications of wireless communications and especially certain uses of wireless devices in the process control industry may require additional caution because of sensitivity of some equipment to electromagnetic waves. Thus, engineers and operators who wish to instrument a potentially explosive process control environment such as an oil refinery with wireless devices face yet another additional challenge of ensuring safety without comprising the reliability and efficiency of communications.

SUMMARY

A wireless mesh network for use in, for example, process control plants includes a plurality of network devices communicating according to a network schedule defined as a set of concurrent overlapping superframes. When a certain event occurs, a network manager running in or outside the wireless mesh network temporarily suspends communications between at least some of the network devices by propagating a predefined suspend command through the wireless mesh network. The interval during which the network suspends communications may be referred to as "quiet time." In some embodiments, the network manager suspends all communications between each pair of network devices and, in this sense, temporarily suspends the entire wireless mesh network. In another embodiment, an application running outside the wireless mesh network triggers the decision of the network manager to suspend a portion or the whole of the wireless mesh network by reporting an event to the network manager via a gateway device connecting the wireless mesh network to an external network. In one particular embodiment, the event which triggers the suspension of wireless communications is a planned controlled explosion requiring radio silence.

In some embodiments, the network manager specifies, as a part of the suspend command, an amount of time during which some or all of the network devices must suspend wireless transmissions. In other embodiments, network devices participating in the wireless mesh network are preconfigured with the amount of time during which the wireless transmissions must be suspended.

In one embodiment, a network device immediately suspends transmissions upon receiving the suspend command from the network manager, and the network manager does not expect to receive an acknowledgement for the suspend command. In other embodiments, the suspend command specifies both the time at which the network device must suspend wireless communications and the time at which the network must resume communications. In at least some of these embodiments, the network device may properly acknowledge the suspend command.

In yet another embodiment, a network device may suspend transmissions but continue to listen to incoming data packets after receiving the suspend command. In this embodiment, neither the suspend command nor the network device configuration may specify the resume time or the duration of a quiet period. Instead, the network manager may propagate the suspend command through the network and, upon occurrence of a certain condition, may propagate a wake-up command to resume communications through the suspended network. Because the network devices may continue to listen to data packets according to the original schedule, the wireless network may quickly and efficiently resume operation after a period of quiet time.

In another aspect, each superframe defined in the wireless mesh network includes several communication timeslots of a predetermined duration and each superframe repeats immediately as a new superframe cycle after the occurrence of all communication timeslots in the previous superframe cycle. The timeslots within each superframe cycle are sequentially numbered relative to the beginning of the cycle. The wireless mesh network additionally maintains an Absolute Slot Number (ASN) indicative of a number of timeslots scheduled since the time of formation of the wireless network. In at least some of the embodiments, the network devices efficiently re-synchronize communications upon the expiration of suspend time by aligning the respective ASN values with a global ASN value maintained by the network manager. Further, the suspend command in some of the embodiments specifies the time to suspend the network, the time to resume the network, or both in ASN units.

DETAILED DESCRIPTION OF THE DRAWINGS

Figure 5:
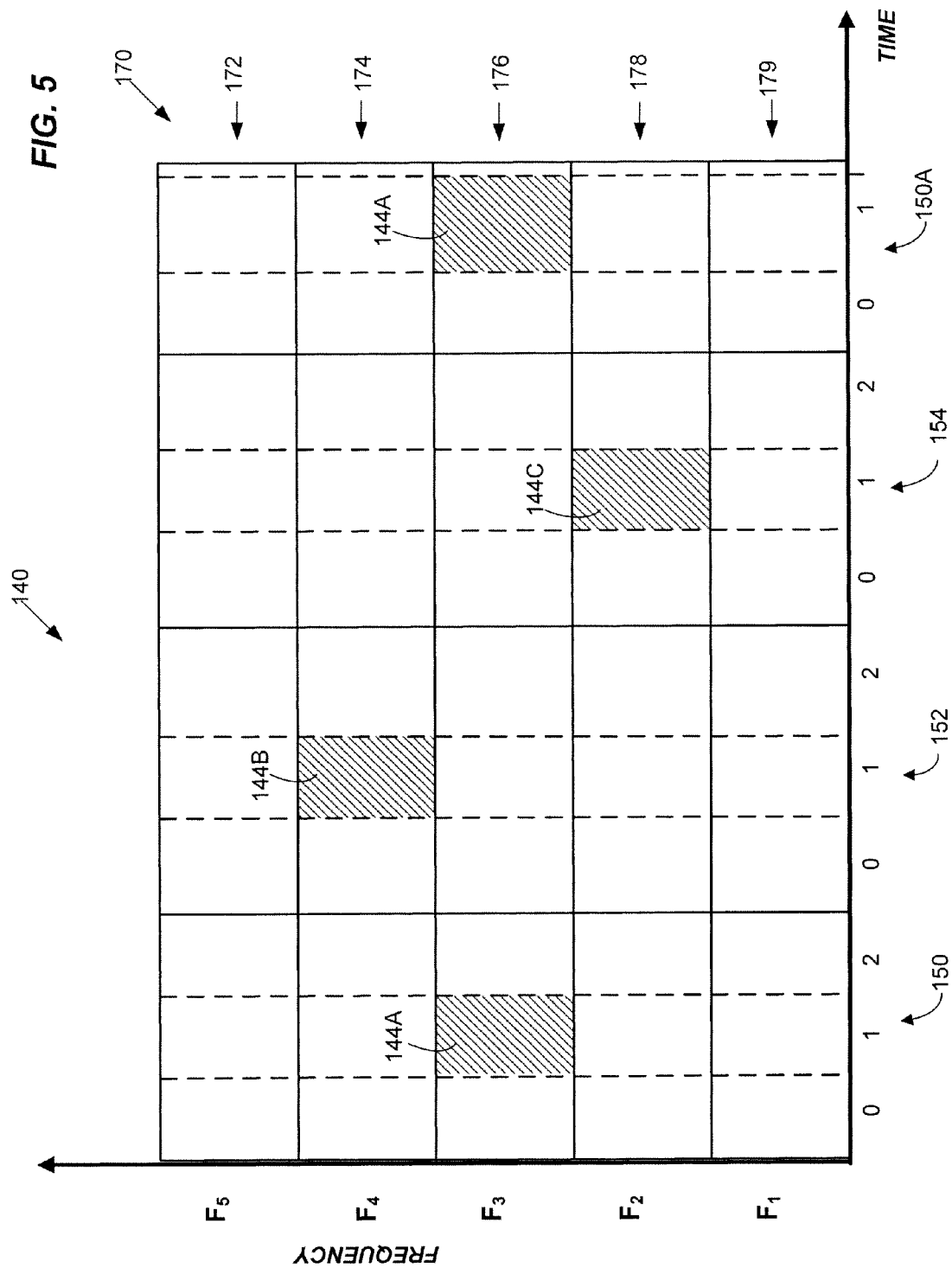

FIG. 5 schematically illustrates association of a timeslot of an exemplary superframe with several communication channels.

Figure 6:
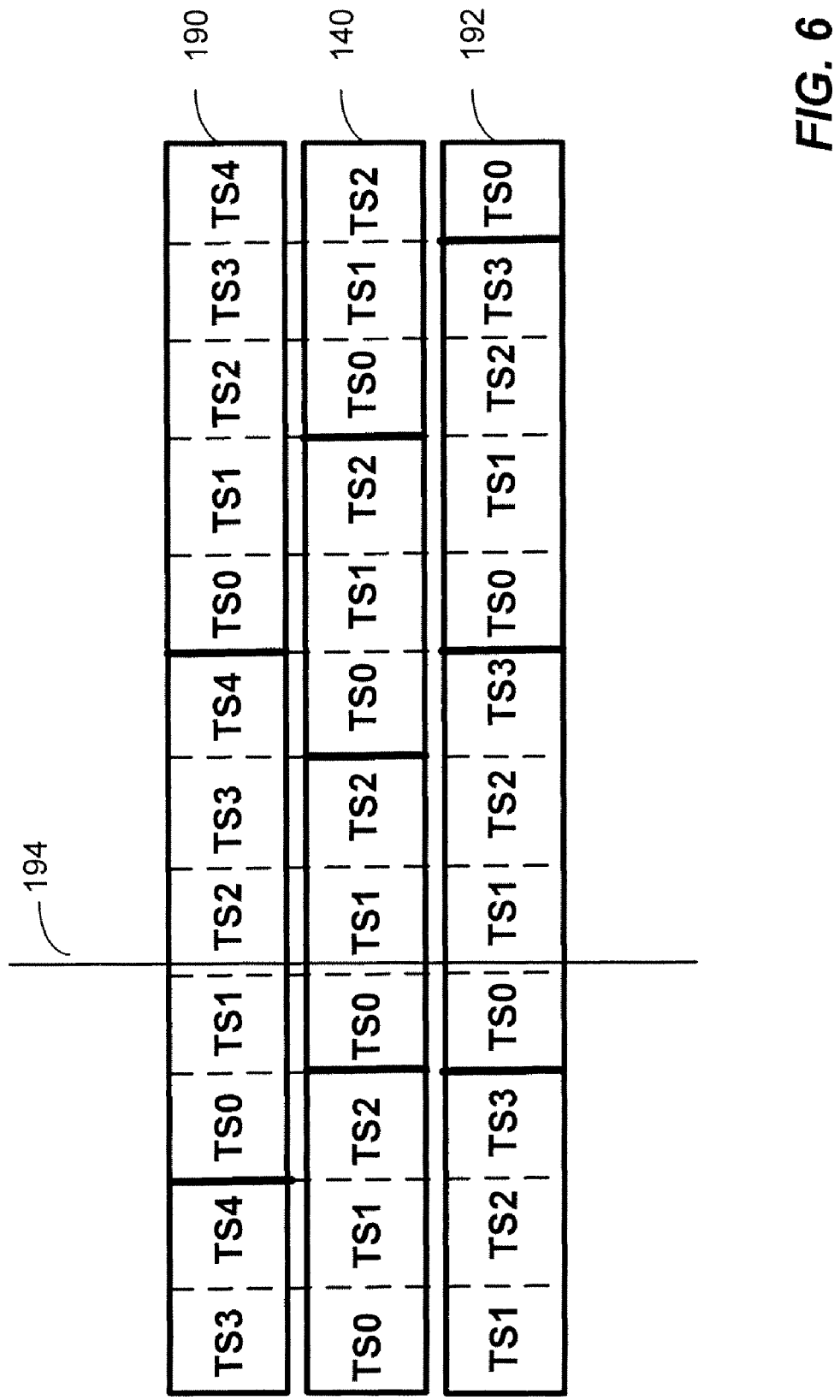

FIG. 6 is a block diagram that schematically illustrates an exemplary superframe definition including several concurrent superframes of different length.

Figure 7:
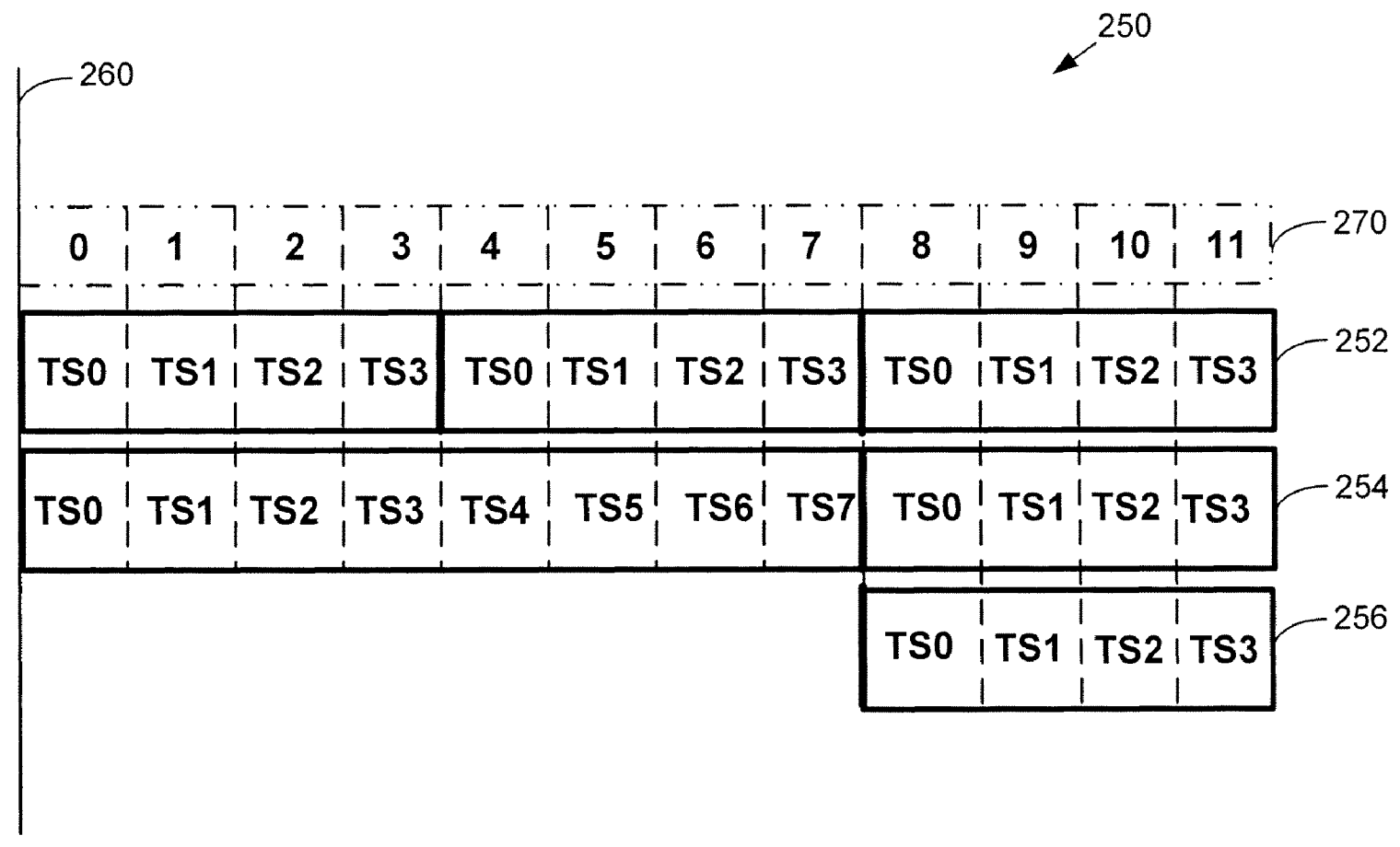

FIG. 7 is another block diagram that schematically illustrates several concurrent superframes of different length in relation to an absolute slot number counter.

Figure 1:
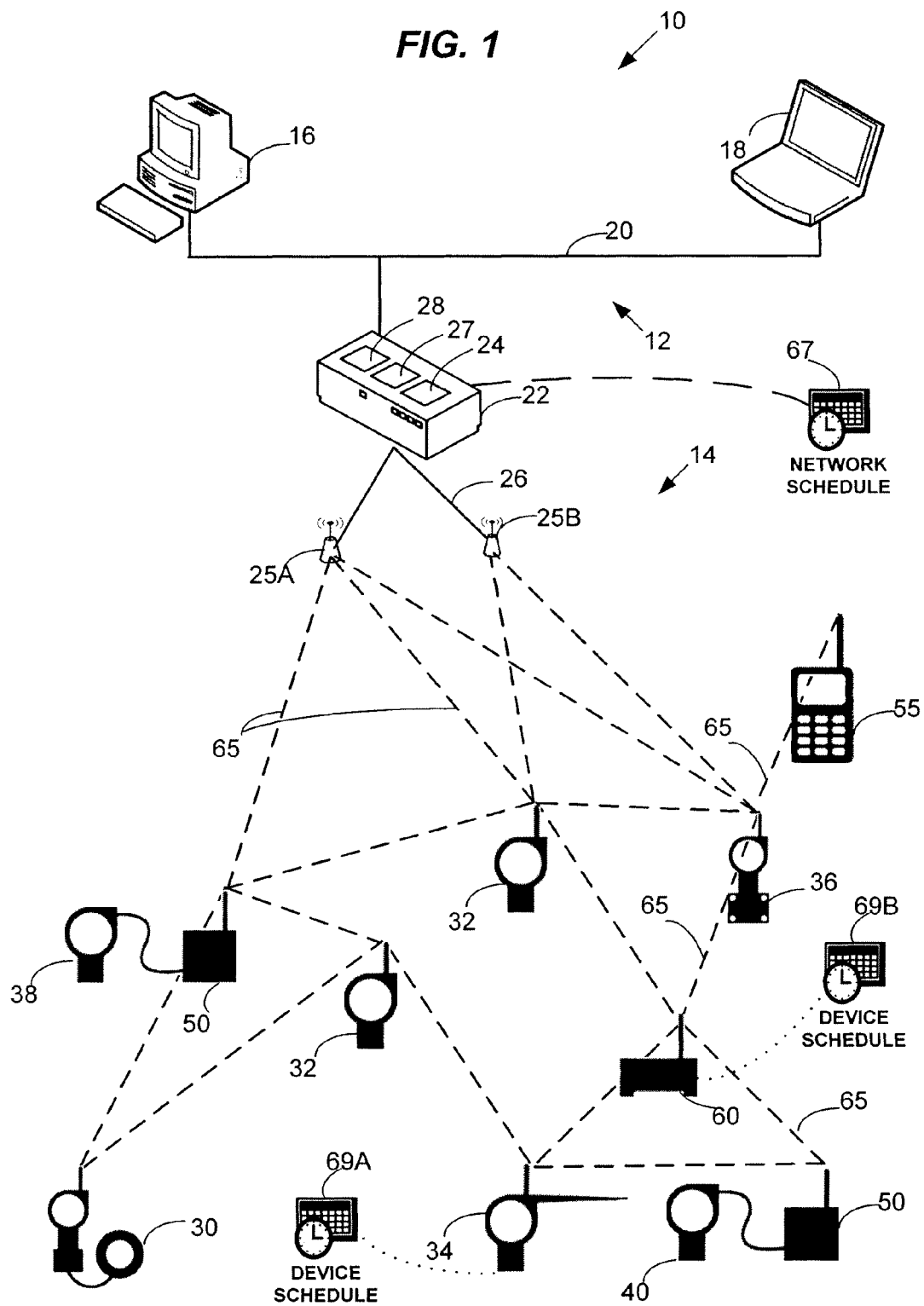
FIG. 1 is a block diagram that illustrates a system utilizing a WirelessHART network to provide wireless communication between field devices and router devices, which are connected to a plant automation network via a gateway device.
Figure 8:
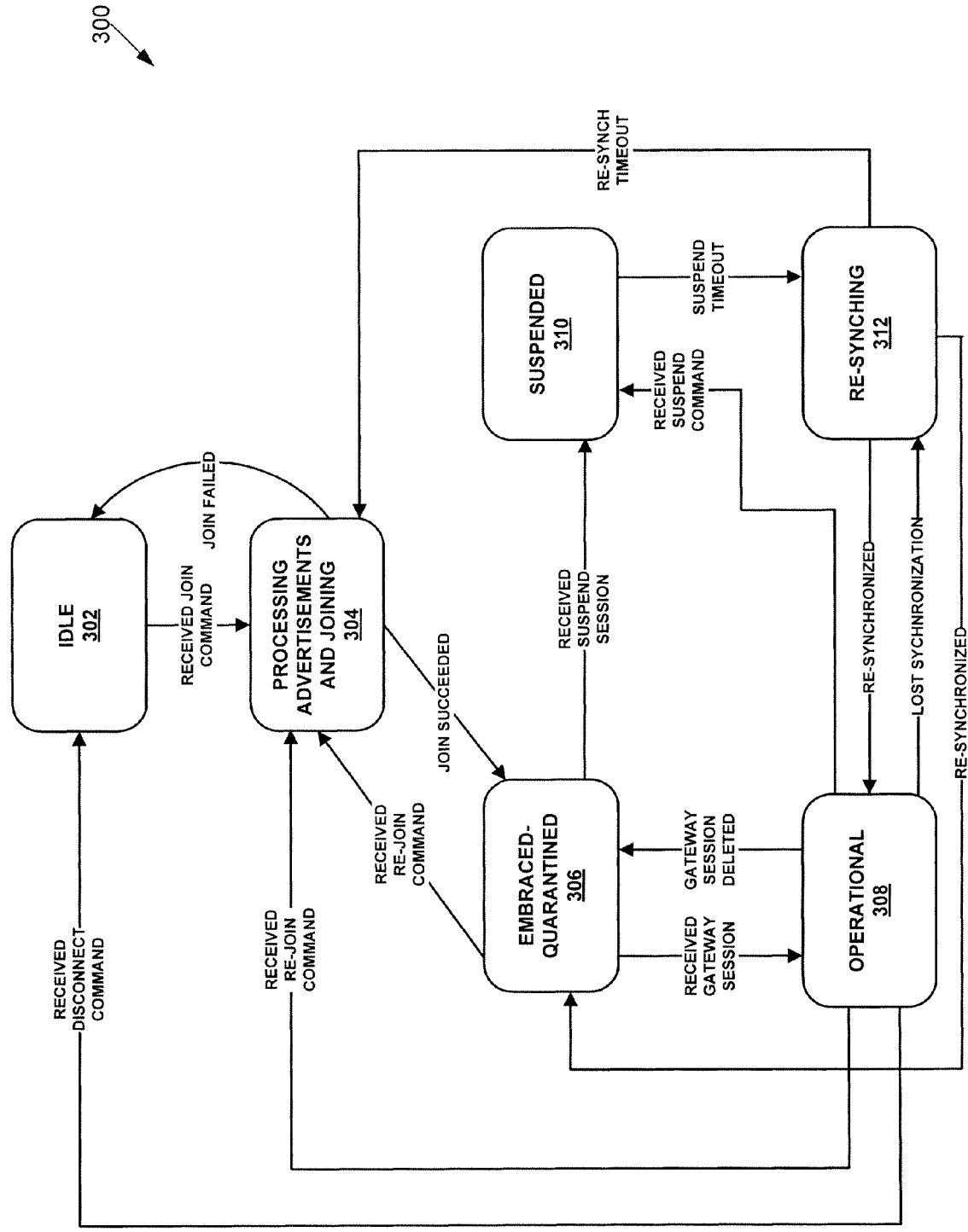

FIG. 8 illustrates an example state machine which a network device may execute when operating in the wireless network of FIG. 1.

DETAILED DESCRIPTION

FIG. 1 illustrates an exemplary network 10 in which the method for suspending transmissions described herein may be used. In particular, the network 10 may include a plant automation network 12 connected to a wireless communication network 14. The plant automation network 12 may include one or more stationary workstations 16 and one or more portable workstations 18 connected over a communication backbone 20 which may be implemented using Ethernet, RS-485, Profibus DP, or using other suitable communication hardware and protocol. The workstations and other equipment forming the plant automation network 12 may provide various control and supervisory functions to plant personnel, including access to devices in the wireless network 14. The plant automation network 12 and the wireless network 14 may be connected via a gateway device 22. More specifically, the gateway device 22 may be connected to the backbone 20 in a wired manner and may communicate with the plant automation network 12 using any suitable (e.g., known) communication protocol. The gateway device 22, which may be implemented in any other desired manner (e.g., as a standalone device, a card insertable into an expansion slot of the host workstations 16 or 18, as a part of the input/output (IO) subsystem of a PLC-based or DCS-based system, etc.), may provide applications that are running on the network 12 with access to various devices of the wireless network 14. In addition to protocol and command conversion, the gateway device 22 may provide synchronized clocking used by time slots and superframes (sets of communication time slots spaced equally in time) of a scheduling scheme associated with a wireless protocol (referred to herein as a WirelessHART protocol) implemented in the network 14.

In some configurations, the network 10 may include more than one gateway device 22 to improve the efficiency and reliability of the network 10. In particular, multiple gateway devices 22 may provide additional bandwidth for the communication between the wireless network 14 and the plant automation network 12, as well as the outside world. On the other hand, the gateway 22 device may request bandwidth from the appropriate network service according to the gateway communication needs within the wireless network 14. A network manager software module 27, which may reside in the gateway device 22, may further reassess the necessary bandwidth while the system is operational. For example, the gateway device 22 may receive a request from a host residing outside of the wireless network 14 to retrieve a large amount of data. The gateway device 22 may then request the network manager 27 to allocate additional bandwidth to accommodate this transaction. For example, the gateway device 22 may issue an appropriate service request. The gateway device 22 may then request the network manager 27 to release the bandwidth upon completion of the transaction.

In general, the network manager 27 may be responsible for adapting the wireless network 14 to changing conditions and for scheduling communication resources. As network devices join and leave the network, the network manager 27 may update its internal model of the wireless network 14 and use this information to generate communication schedules and communication routes. Additionally, the network manager 27 may consider the overall performance of the wireless network 14 as well as the diagnostic information to adapt the wireless network 14 to changes in topology and communication requirements. Once the network manager 27 has generated the overall communication schedule, all or respective parts of the overall communication schedule may be transferred through a series of commands from the network manager 27 to the network devices.

To further increase bandwidth and improve reliability, the gateway device 22 may be functionally divided into a virtual gateway 24 and one or more network access points 25, which may be separate physical devices in wired communication with the gateway device 22. However, while FIG. 1 illustrates a wired connection 26 between the physically separate gateway device 22 and the access points 25, it will be understood that the elements 22-26 may also be provided as an integral device. Because the network access points 25 may be physically separated from the gateway device 22, the access points 25 may be strategically placed in several different locations with respect to the network 14. In addition to increasing the bandwidth, multiple access points 25 can increase the overall reliability of the network 14 by compensating for a potentially poor signal quality at one access point 25 using the other access point 25. Having multiple access points 25 also provides redundancy in case of a failure at one or more of the access points 25.

In addition to allocating bandwidth and otherwise bridging the networks 12 and 14, the gateway device 22 may perform one or more managerial functions in the wireless network 14. As illustrated in FIG. 1, a network manager software module 27 and a security manager software module 28 may be stored in and executed in the gateway device 22. Alternatively, the network manager 27 and/or the security manager 28 may run on one of the hosts 16 or 18 in the plant automation network 12. For example, the network manager 27 may run on the host 16 and the security manager 28 may run on the host 18. The network manager 27 may be responsible for configuration of the network 14, scheduling communication between wireless devices, managing routing tables associated with the wireless devices, monitoring the overall health of the wireless network 14, reporting the health of the wireless network 14 to the workstations 16 and 18, as well as other administrative and supervisory functions. Although a single active network manager 27 may be sufficient in the wireless network 14, redundant network managers 27 may be similarly supported to safeguard the wireless network 14 against unexpected equipment failures. Meanwhile, the security manager 28 may be responsible for protecting the wireless network 14 from malicious or accidental intrusions by unauthorized devices. To this end, the security manager 28 may manage authentication codes, verify authorization information supplied by devices attempting to join the wireless network 14, update temporary security data such as expiring secret keys, and perform other security functions.

With continued reference to FIG. 1, the wireless network 14 may include one or more field devices 30-36. In general, process control systems, like those used in chemical, petroleum or other process plants, include such field devices as valves, valve positioners, switches, sensors (e.g., temperature, pressure and flow rate sensors), pumps, fans, etc. Field devices perform physical control functions within the process such as opening or closing valves or take measurements of process parameters. In the wireless communication network 14, field devices 30-36 are producers and consumers of wireless communication packets.

The devices 30-36 may communicate using a wireless communication protocol that provides the functionality of a similar wired network, with similar or improved operational performance. In particular, this protocol may enable the system to perform process data monitoring, critical data monitoring (with the more stringent performance requirements), calibration, device status and diagnostic monitoring, field device troubleshooting, commissioning, and supervisory process control. The applications performing these functions, however, typically require that the protocol supported by the wireless network 14 provide fast updates when necessary, move large amounts of data when required, and support network devices which join the wireless network 14, even if only temporarily for commissioning and maintenance work.

In one embodiment, the wireless protocol supporting network devices 30-36 of the wireless network 14 is an extension of the known wired HART protocol, a widely accepted industry standard, which maintains the simple workflow and practices of the wired environment. In this sense, the network devices 30-36 may be considered WirelessHART devices. The same tools used for wired HART devices may be easily adapted to wireless devices 30-36 with a simple addition of new device description files. In this manner, the wireless protocol may leverage the experience and knowledge gained using the wired HART protocol to minimize training and simplify maintenance and support. Generally speaking, it may be convenient to adapt a protocol for wireless use so that most applications running on a device do not "notice" the transition from a wired network to a wireless network. Clearly, such transparency greatly reduces the cost of upgrading networks and, more generally, reduces the cost associated with developing and supporting devices that may be used with such networks. Some of the additional benefits of a wireless extension of the well-known HART protocol include access to measurements that were difficult or expensive to obtain with wired devices and the ability to configure and operate instruments from system software that can be installed on laptops, handhelds, workstations, etc. Another benefit is the ability to send diagnostic alerts from wireless devices back through the communication infrastructure to a centrally located diagnostic center. For example, every heat exchanger in a process plant could be fitted with a WirelessHART device and the end user and supplier could be alerted when a heat exchanger detects a problem. Yet another benefit is the ability to monitor conditions that present serious health and safety problems. For example, a WirelessHART device could be placed in flood zones on roads and be used to alert authorities and drivers about water levels. Other benefits include access to a wide range of diagnostics alerts and the ability to store trended as well as calculated values at the WirelessHART devices so that, when communications to the device are established, the values can be transferred to a host. In this manner, the WirelessHART protocol can provide a platform that enables host applications to have wireless access to existing HART-enabled field devices and the WirelessHART protocol can support the deployment of battery operated, wireless only HART-enabled field devices. The WirelessHART protocol may be used to establish a wireless communication standard for process applications and may further extend the application of HART communications and the benefits that this protocol provides to the process control industry by enhancing the basic HART technology to support wireless process automation applications.

Referring again to FIG. 1, the field devices 30-36 may be WirelessHART field devices, each provided as an integral unit and supporting all layers of the WirelessHART protocol stack. For example, in the network 14, the field device 30 may be a WirelessHART flow meter, the field devices 32 may be WirelessHART pressure sensors, the field device 34 may be a WirelessHART valve positioner, and the field device 36 may a WirelessHART pressure sensor. Importantly, the wireless devices 30-36 may support all of the HART features that users have come to expect from the wired HART protocol. As one of ordinary skill in the art will appreciate, one of the core strengths of the HART protocol is its rigorous interoperability requirements. In some embodiments, all WirelessHART equipment includes core mandatory capabilities in order to allow equivalent device types (made by different manufacturers, for example) to be interchanged without compromising system operation. Furthermore, the WirelessHART protocol is backward compatible to HART core technology such as the device description language (DDL). In the preferred embodiment, all of the WirelessHART devices should support the DDL, which ensures that end users immediately have the tools to begin utilizing the WirelessHART protocol.

If desired, the network 14 may include non-wireless devices. For example, a field device 38 of FIG. 1 may be a legacy 4-20 mA device and a field device 40 may be a traditional wired HART device. To communicate within the network 14, the field devices 38 and 40 may be connected to the WirelessHART network 14 via a WirelessHART adapter (WHA) 50. Additionally, the WHA 50 may support other communication protocols such as Foundation® Fieldbus, PROFIBUS, DevicesNet, etc. In these embodiments, the WHA 50 supports protocol translation on a lower layer of the protocol stack. Additionally, it is contemplated that a single WHA 50 may also function as a multiplexer and may support multiple HART or non-HART devices.

Plant personnel may additionally use handheld devices for installation, control, monitoring, and maintenance of network devices. Generally speaking, handheld devices are portable equipment that can connect directly to the wireless network 14 or through the gateway devices 22 as a host on the plant automation network 12. As illustrated in FIG. 1, a WirelessHART-connected handheld device 55 may communicate directly with the wireless network 14. When operating with a formed wireless network 14, the handheld device 55 may join the network 14 as just another WirelessHART field device. When operating with a target network device that is not connected to a WirelessHART network, the handheld device 55 may operate as a combination of the gateway device 22 and the network manager 27 by forming its own wireless network with the target network device.

A plant automation network-connected handheld device (not shown) may be used to connect to the plant automation network 12 through known networking technology, such as Wi-Fi. This device communicates with the network devices 30-40 through the gateway device 22 in the same fashion as external plant automation servers (not shown) or the workstations 16 and 18 communicate with the devices 30-40.

Additionally, the wireless network 14 may include a router device 60 which is a network device that forwards packets from one network device to another network device. A network device that is acting as a router device uses internal routing tables to conduct routing, i.e., to decide to which network device a particular packet should be sent. Standalone routers such as the router 60 may not be required in those embodiments where all of the devices on the wireless network 14 support routing. However, it may be beneficial (e.g. to extend the network, or to save the power of a field device in the network) to add one or more dedicated routers 60 to the network 14.

All of the devices directly connected to the wireless network 14 may be referred to as network devices. In particular, the wireless field devices 30-36, the adapters 50, the routers 60, the gateway devices 22, the access points 25, and the wireless handheld device 55 are, for the purposes of routing and scheduling, network devices, each of which forms a node of the wireless network 14. In order to provide a very robust and an easily expandable wireless network, all of the devices in a network may support routing and each network device may be globally identified by a substantially unique address, such as a HART address, for example. The network manager 27 may contain a complete list of network devices and may assign each device a short, network unique 16-bit nickname. Additionally, each network device may store information related to update rates, connection sessions, and device resources. In short, each network device maintains up-to-date information related to routing and scheduling within the wireless network 14. The network manager 27 may communicate this information to network devices whenever new devices join the network or whenever the network manager 27 detects or originates a change in topology or scheduling of the wireless network 14.

Further, each network device may store and maintain a list of neighbor devices that the network device has identified during listening operations. Generally speaking, a neighbor of a network device is another network device of any type potentially capable of establishing a connection with the network device in accordance with the standards imposed by a corresponding network. In case of the WirelessHART network 14, the connection is a direct wireless connection. However, it will be appreciated that a neighboring device may also be a network device connected to the particular device in a wired manner. As will be discussed later, network devices promote their discovery by other network devices through advertisement, or special messages sent out during designated periods of time. Network devices operatively connected to the wireless network 14 have one or more neighbors which they may choose according to the strength of the advertising signal or to some other principle.

In the example illustrated in FIG. 1, each of a pair of network devices that are connected by a direct wireless connection 65 recognizes the other as a neighbor. Thus, network devices of the wireless network 14 may form a large number of inter-device connections 65. The possibility and desirability of establishing a direct wireless connection 65 between two network devices is determined by several factors, such as the physical distance between the nodes, obstacles between the nodes (devices), signal strength at each of the two nodes, etc. Further, two or more direct wireless connections 65 may be used to form communication paths between nodes that cannot form a direct wireless connection 65. For example, the direct wireless connection 65 between the WirelessHART hand-held device 55 and WirelessHART device 36 along with the direct wireless connection 65 between the WirelessHART device 36 the router 60 form a communication path between the devices 55 and 60.

Each wireless connection 65 is characterized by a large set of parameters related to the frequency of transmission, the method of access to a radio resource, etc. One of ordinary skill in the art will recognize that, in general, wireless communication protocols may operate on designated frequencies, such as the ones assigned by the Federal Communications Commission (FCC) in the United States, or in the unlicensed part of the radio spectrum (e.g., 2.4 GHz). While the system and method discussed herein may be applied to a wireless network operating on any designated frequency or range of frequencies, the example embodiment discussed below relates to the wireless network 14 operating in the unlicensed, or shared part of the radio spectrum. In accordance with this embodiment, the wireless network 14 may be easily activated and adjusted to operate in a particular unlicensed frequency range as needed.

One of the core requirements for a wireless network protocol using an unlicensed frequency band is the minimally disruptive coexistence with other equipment utilizing the same band. Coexistence generally defines the ability of one system to perform a task in a shared environment in which other systems can similarly perform their tasks while conforming to the same set of rules or to a different (and possibly unknown) set of rules. One requirement of coexistence in a wireless environment is the ability of the protocol to maintain communication while interference is present in the environment. Another requirement is that the protocol should cause as little interference and disruption as possible with respect to other communication systems.

In other words, the problem of coexistence of a wireless system with the surrounding wireless environment has two general aspects. The first aspect of coexistence is the manner in which the system affects other systems. For example, an operator or developer of the particular system may ask what impact the transmitted signal of one transmitter has on other radio system operating in proximity to the particular system. More specifically, the operator may ask whether the transmitter disrupts communication of some other wireless device every time the transmitter turns on or whether the transmitter spends excessive time on the air effectively "hogging" the bandwidth. Ideally, each transmitter should be a "silent neighbor" that no other transmitter notices. While this ideal characteristic is rarely, if ever, attainable, a wireless system that creates a coexistence environment in which other wireless communication systems may operate reasonably well may be called a "good neighbor." The second aspect of coexistence of a wireless system is the ability of the system to operate reasonably well in the presence of other systems or wireless signal sources. In particular, the robustness of a wireless system may depend on how well the wireless system prevents interference at the receivers, on whether the receivers easily overload due to proximate sources of RF energy, on how well the receivers tolerate an occasional bit loss, and similar factors. In some industries, including the process control industry, there are a number of important potential applications in which the loss of data is frequently not allowable. A wireless system capable of providing reliable communications in a noisy or dynamic radio environment may be called a "tolerant neighbor."

Effective coexistence (i.e., being a good neighbor and a tolerant neighbor) relies in part on effectively employing three aspects of freedom: time, frequency and distance. Communication can be successful when it occurs 1) at a time when the interference source (or other communication system) is quiet; 2) at a different frequency than the interference signal; or 3) at a location sufficiently removed from the interference source. While a single one of these factors could be used to provide a communication scheme in the shared part of the radio spectrum, a combination of two or all three of these factors can provide a high degree of reliability, security and speed.

Still referring to FIG. 1, the network manager 27 or another application or service running on the network 14 or 12 may define a master network schedule 67 for the wireless communication network 14 in view of the factors discussed above. The master network schedule 67 may specify the allocation of resources such as time segments and radio frequencies to the network devices 25 and 30-55. In particular, the master network schedule 67 may specify when each of the network devices 25 and 30-55 transmits process data, routes data on behalf of other network devices, listens to management data propagated from the network manager 27, and transmits advertisement data for the benefit of devices wishing to join the wireless network 14. To allocate the radio resources in an efficient manner, the network manager 27 may define and update the master network schedule 67 in view of the topology of the wireless network 14. More specifically, the network manager 27 may allocate the available resources to each of the nodes of the wireless network 14 (i.e., wireless devices 30-36, 50, and 60) according to the direct wireless connections 65 identified at each node. In this sense, the network manager 27 may define and maintain the network schedule 67 in view of both the transmission requirements and of the routing possibilities at each node.

The master network schedule 67 may partition the available radio sources into individual communication channels, and further measure transmission and reception opportunities on each channel in such units as Time Division Multiple Access (TDMA) communication timeslots, for example. In particular, the wireless network 14 may operate within a certain frequency band which, in most cases, may be safely associated with several distinct carrier frequencies, so that communications at one frequency may occur at the same time as communications at another frequency within the band. One of ordinary skill in the art will appreciate that carrier frequencies in a typical application (e.g., public radio) are sufficiently spaced apart to prevent interference between the adjacent carrier frequencies. For example, in the 2.4 GHz band, IEEE assigns frequency 2.455 to channel number 21 and frequency 2.460 to channel number 22, thus allowing the spacing of 5 KHz between two adjacent segments of the 2.4 GHz band. The master network schedule 67 may thus associate each communication channel with a distinct carrier frequency, which may be the center frequency in a particular segment of the band.

Meanwhile, as typically used in the industries utilizing TDMA technology, the term "timeslot" refers to a segment of a specific duration into which a larger period of time is divided to provide a controlled method of sharing. For example, a second may be divided into 10 equal 100 millisecond timeslots. Although the master network schedule 67 preferably allocates resources as timeslots of a single fixed duration, it is also possible to vary the duration of the timeslots, provided that each relevant node of the wireless network 14 is properly notified of the change. To continue with the example definition of ten 100-millisecond timeslots, two devices may exchange data every second, with one device transmitting during the first 100 ms period of each second (i.e., the first timeslot), the other device transmitting during the fourth 100 ms period of each second (i.e., the fourth timeslot), and with the remaining timeslots being unoccupied. Thus, a node on the wireless network 14 may identify the scheduled transmission or reception opportunity by the frequency of transmission and the timeslot during which the corresponding device may transmit or receive data.

To properly synchronize the network devices 25A-B and 30-50 with the master network schedule 67, the network manager 27 may maintain a counter 68 to keep track of a number of timeslots scheduled since the formation of the wireless network 14, i.e., since a first network device initiated the process of forming the wireless network 14. As indicated above, the first network device may be the gateway device 22, for example. The number of timeslots elapsed since the beginning of the wireless network 14 is referred to herein as the Absolute Slot Number ("ASN"), in contrast to a relative slot number of a timeslot in a particular superframe. The network manager 27 may initialize the ASN counter 68 to zero at the time of formation of the wireless network 14 and increment consequently increment the ASN counter 68 by one with each occurrence of a new timeslot. Additionally, each of the network devices 25A-B and 30-50 may similarly maintain a local copy of the ASN counter 68 and periodically synchronize the local copy with the master ASN counter 68 maintained by the network manager 27.

As discussed in greater detail below, some or all of the network devices 25A-B and 30-50 may sometimes suspend wireless transmission and, optionally, reception in response to receiving a suspend command from the network manager 27. The suspend command may be triggered by an event reported by a user operating the workstation 16, by a command from the handheld device 55, by an automated task running in the plant automation network 12, or internally by one of the network devices 25A-B and 30-50 which may report a certain high-severity alarm to the network manager 27, thereby triggering a temporary or permanent emergency shutdown of wireless communications. The network devices 25A-B and 30-50 may rely the ASN value to determine the period of time during which wireless transmissions are not allowed and further for re-synchronizing with the wireless network 14 when the suspension expires or is explicitly lifted by an operator command.

As part of defining an efficient and reliable network schedule 67, the network manager 27 may logically organize timeslots into cyclically repeating sets, or superframes. As used herein, a superframe may be more precisely understood as a series of equal superframe cycles, each superframe cycle corresponding to a logical grouping of several adjacent time slots forming a contiguous segment of time. The number of time slots in a given superframe defines the length of the superframe and determines how often each time slot repeats. In other words, the length of a superframe, multiplied by the duration of a single timeslot, specifies the duration of a superframe cycle. Additionally, the timeslots within each frame cycle may be sequentially numbered for convenience. To take one specific example, the network manager 27 may fix the duration of a timeslot at 10 milliseconds and may define a superframe of length 100 to generate a 1-second frame cycle (i.e., 10 milliseconds multiplied by 100). In a zero-based numbering scheme, this example superframe may include timeslots numbered 0, 1, . . . 99.

The network manager 27 may reduce latency and otherwise optimize data transmissions by including multiple concurrent superframes of different sizes in the network schedule 67. Moreover, some or all of the superframes of the network schedule 67 may span multiple channels, or carrier frequencies. Thus, the master network schedule 67 may specify the association between each timeslot of each superframe and one of the available channels.

Thus, the master network schedule 67 may correspond to an aggregation of individual device schedules. For example, a network device, such as the valve positioner 34, may have an individual device schedule 69A. The device schedule 69A may include only the information relevant to the corresponding network device 34. Similarly, the router device 60 may have an individual device schedule 69B. Accordingly, the network device 34 may transmit and receive data according to the device schedule 69A without knowing the schedules of other network devices such as the schedule 69B of the device 60. To this end, the network manager 27 may manage both the overall network schedule 67 and each of the individual device schedules 69 (e.g., 69A and 69B) and communicate the individual device schedules 69 to the corresponding devices when necessary. In other embodiments, the individual network devices 25 and 35-50 may at least partially define or negotiate the device schedules 69 and report these schedules to the network manager 27. According to this embodiment, the network manager 27 may assemble the network schedule 67 from the received device schedules 69 while checking for resource contention and resolving potential conflicts.

Figure 2:
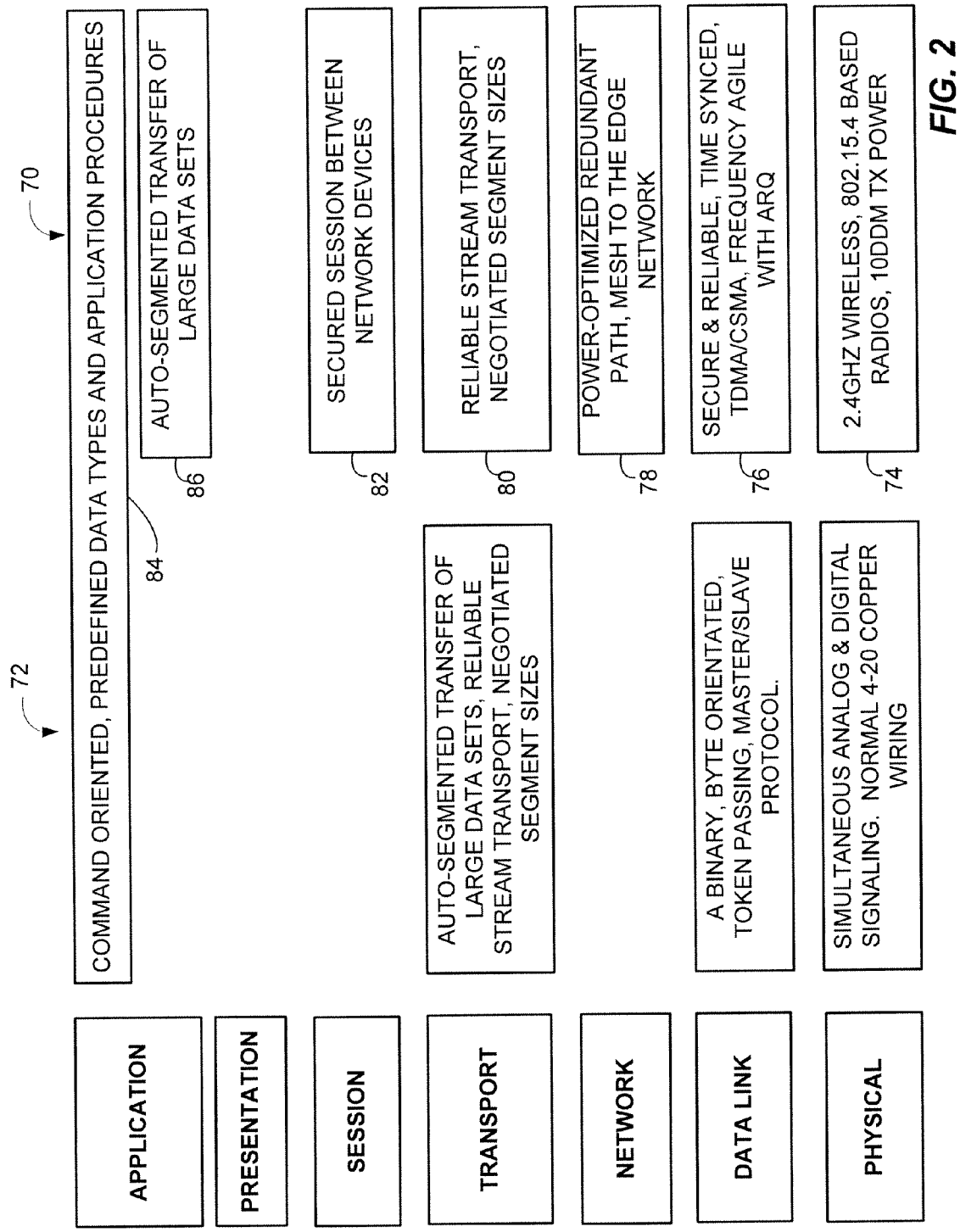
FIG. 2 is a schematic representation of the layers of a WirelessHART protocol implemented in accordance with one of the embodiments discussed herein.

The communication protocol supporting the wireless network 14 generally described above is referred to herein as the WirelessHART protocol 70, and the operation of this protocol is discussed in more detail with respect to FIG. 2. As will be understood, each of the direct wireless connections 65 may transfer data according to the physical and logical requirements of the WirelessHART protocol 70. Meanwhile, the WirelessHART protocol 70 may efficiently support communications within timeslots and on the carrier frequencies associated with the superframes defined by the device-specific schedules 69.

FIG. 2 schematically illustrates the layers of one example embodiment of the WirelessHART protocol 70, approximately aligned with the layers of the well-known ISO/OSI 7-layer model for communications protocols. By way of comparison, FIG. 2 additionally illustrates the layers of the existing "wired" HART protocol 72. It will be appreciated that the WirelessHART protocol 70 need not necessarily have a wired counterpart. However, as will be discussed in detail below, the WirelessHART protocol 70 can significantly improve the convenience of its implementation by sharing one or more upper layers of the protocol stack with an existing protocol. As indicated above, the WirelessHART protocol 70 may provide the same or greater degree of reliability and security as the wired protocol 72 servicing a similar network. At the same time, by eliminating the need to install wires, the WirelessHART protocol 70 may offer several important advantages, such as the reduction of cost associated with installing network devices, for example. It will be also appreciated that although FIG. 2 presents the WirelessHART protocol 70 as a wireless counterpart of the HART protocol 72, this particular correspondence is provided herein by way of example only. In other possible embodiments, one or more layers of the WirelessHART protocol 70 may correspond to other protocols or, as mentioned above, the WirelessHART protocol 70 may not share even the uppermost application layer with any of the existing protocols.

As illustrated in FIG. 2, the wireless expansion of HART technology may add at least one new physical layer (e.g., the IEEE 802.15.4 radio standard) and two data-link layers (e.g., wired and wireless mesh) to the known HART implementation. In general, the WirelessHART protocol 70 may be a secure, wireless mesh networking technology operating in the 2.4 GHz ISM radio band (block 74). In one embodiment, the WirelessHART protocol 70 may utilize IEEE 802.15.4b compatible direct sequence spread spectrum (DSSS) radios with channel hopping on a transaction by transaction basis. This WirelessHART communication may be arbitrated using TDMA to schedule link activity (block 76). As such, all communications are preferably performed within a designated time slot. One or more source and one or more destination devices may be scheduled to communicate in a given slot, and each slot may be dedicated to communication from a single source device, or the source devices may be scheduled to communicate using a CSMA/CA-like shared communication access mode. Source devices may send messages to one or more specific target devices or may broadcast messages to all of the destination devices assigned to a slot.

Because the WirelessHART protocol described herein allows deployment of mesh topologies, a significant network layer 78 may be specified as well. In particular, the network layer 78 may enable establishing direct wireless connections 65 between individual devices and routing data between a particular node of the wireless network 14 (e.g., the device 34) and the gateway 22 via one or more intermediate hops. In some embodiments, pairs of network devices 25A-B and 30-50 may establish communication paths including one or several hops while in other embodiments, all data may travel either upstream to the gateway device 22 or downstream from the gateway device 22 to a particular node.

To enhance reliability, the WirelessHART protocol 70 may combine TDMA with a method of associating multiple radio frequencies with a single communication resource, e.g., channel hopping. Channel hopping provides frequency diversity which minimizes interference and reduces multi-path fading effects. In particular, the data link 76 may create an association between a single superframe and multiple carrier frequencies which the data link layer 76 cycles through in a controlled and predefined manner. For example, the available frequency band of a particular instance of the WirelessHART network 14 may have carrier frequencies $F_1, F_2, \ldots F_n$. A relative frame R of a superframe S may be scheduled to occur at a frequency $F_1$ in the cycle $C_n$, at a frequency $F_5$ in the following cycle $C_{n+1}$, at a frequency $F_2$ in the cycle $C_{n+2}$, and so on. The network manager 27 may configure the relevant network devices with this information so that the network devices communicating in the superframe S may adjust the frequency of transmission or reception according to the current cycle of the superframe S.

The data link layer 76 of the WirelessHART protocol 70 may offer an additional feature of channel blacklisting, which restricts the use of certain channels in the radio band by the network devices. The network manager 27 may blacklist a radio channel in response to detecting excessive interference or other problems on the channel. Further, operators or network administrators may blacklist channels in order to protect a wireless service that uses a fixed portion of the radio band that would otherwise be shared with the WirelessHART network 14. In some embodiments, the WirelessHART protocol 70 controls blacklisting on a superframe basis so that each superframe has a separate blacklist of prohibited channels.

In one embodiment, the network manager 27 is responsible for allocating, assigning, and adjusting time slot resources associated with the data link layer 76. If a single instance of the network manager 27 supports multiple WirelessHART networks 14, the network manager 27 may create an overall schedule for each instance of the WirelessHART network 14. The schedule may be organized into superframes containing time slots numbered relative to the start of the superframe.

The WirelessHART protocol 70 may further define links or link objects in order to logically unite scheduling and routing. In particular, a link may be associated with a specific network device, a specific superframe, a relative slot number, one or more link options (transmit, receive, shared), and a link type (normal, advertising, discovery). As illustrated in FIG. 2, the data link layer 76 may be frequency-agile. More specifically, a channel offset may be used to calculate the specific radio frequency used to perform communications. The network manager 27 may define a set of links in view of the communication requirements at each network device. Each network device may then be configured with the defined set of links.

The defined set of links may determine when the network device needs to wake up, and whether the network device should transmit, receive, or both transmit/receive upon waking up.

With continued reference to FIG. 2, the transport layer 80 of the WirelessHART protocol 70 allows efficient, best-effort communication and reliable, end-to-end acknowledged communications. As one skilled in the art will recognize, best-effort communications allow devices to send data packets without an end-to-end acknowledgement and no guarantee of data ordering at the destination device. User Datagram Protocol (UDP) is one well-known example of this communication strategy. In the process control industry, this method may be useful for publishing process data. In particular, because devices propagate process data periodically, end-to-end acknowledgements and retries have limited utility, especially considering that new data is generated on a regular basis. In contrast, reliable communications allow devices to send acknowledgement packets. In addition to guaranteeing data delivery, the transport layer 80 may order packets sent between network devices. This approach may be preferable for request/response traffic or when transmitting event notifications. When the reliable mode of the transport layer 80 is used, the communication may become synchronous.

Reliable transactions may be modeled as a master issuing a request packet and one or more slaves replying with a response packet. For example, the master may generate a certain request and can broadcast the request to the entire network. In some embodiments, the network manager 27 may use reliable broadcast to tell each network device in the WirelessHART network 14 to activate a new superframe. Alternatively, a field device such as the sensor 30 may generate a packet and propagate the request to another field device such as to the portable HART communicator 55. As another example, an alarm or event generated by the 34 field device may be transmitted as a request directed to the gateway device 22. In response to successfully receiving this request, the gateway device 22 may generate a response packet and send the response packet to the device 34, acknowledging receipt of the alarm or event notification.

Referring again to FIG. 2, the session layer 82 may provide session-based communications between network devices. End-to-end communications may be managed on the network layer by sessions. A network device may have more than one session defined for a given peer network device. If desired, almost all network devices may have at least two sessions established with the network manager 27: one for pairwise communication and one for network broadcast communication from the network manager 27. Further, all network devices may have a gateway session key. The sessions may be distinguished by the network device addresses assigned to them. Each network device may keep track of security information (encryption keys, nonce counters) and transport information (reliable transport sequence numbers, retry counters, etc.) for each session in which the device participates.

Finally, both the WirelessHART protocol 70 and the wired HART protocol 72 may support a common HART application layer 84. The application layer of the WirelessHART protocol 70 may additionally include a sub-layer 86 supporting auto-segmented transfer of large data sets. By sharing the application layer 84, the protocols 70 and 72 allow for a common encapsulation of HART commands and data and eliminate the need for protocol translation in the uppermost layer of the protocol stack.

Figure 3:
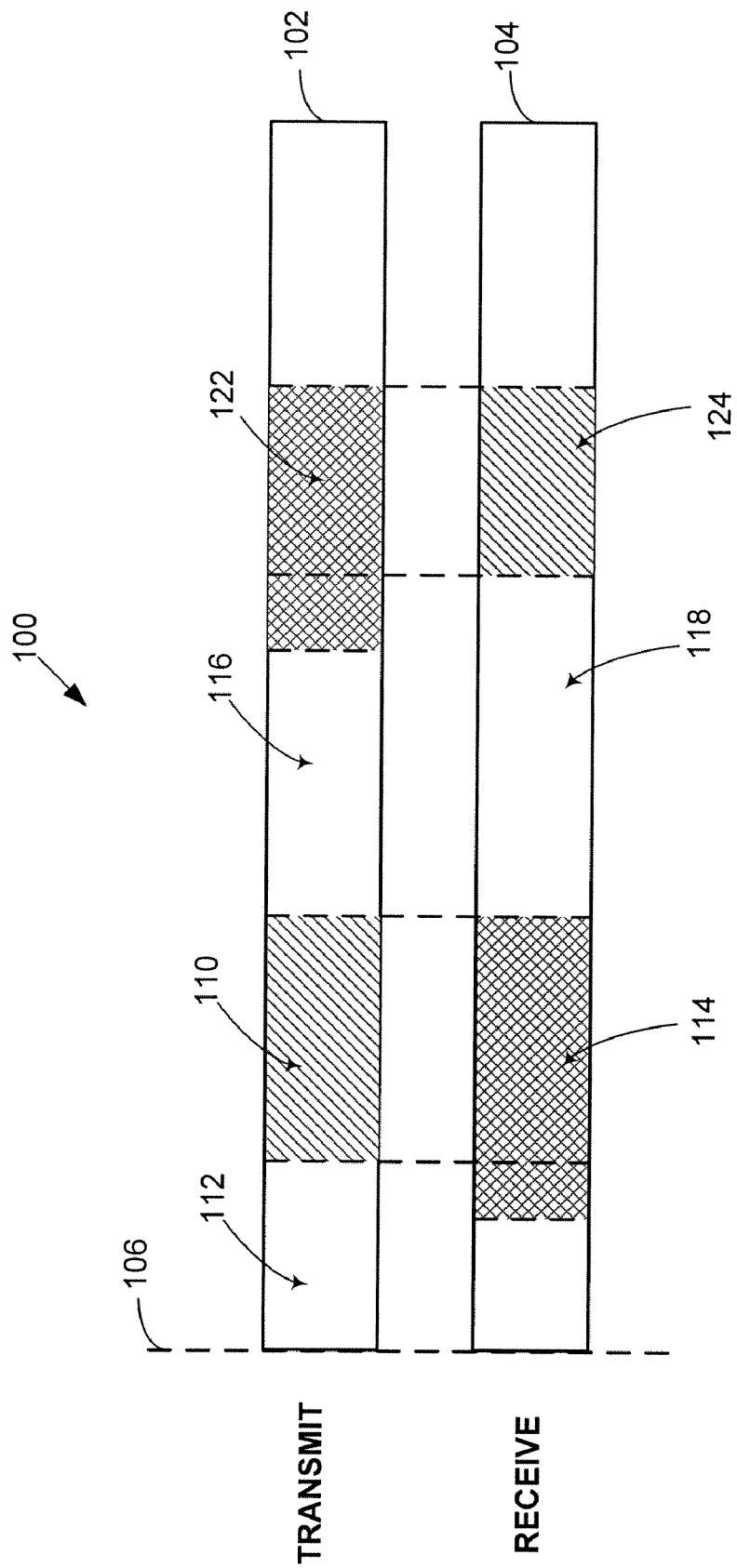
FIG. 3 is a block diagram that illustrates segments of a communication timeslot defined in accordance with one of the embodiments discussed herein.
Figure 4:
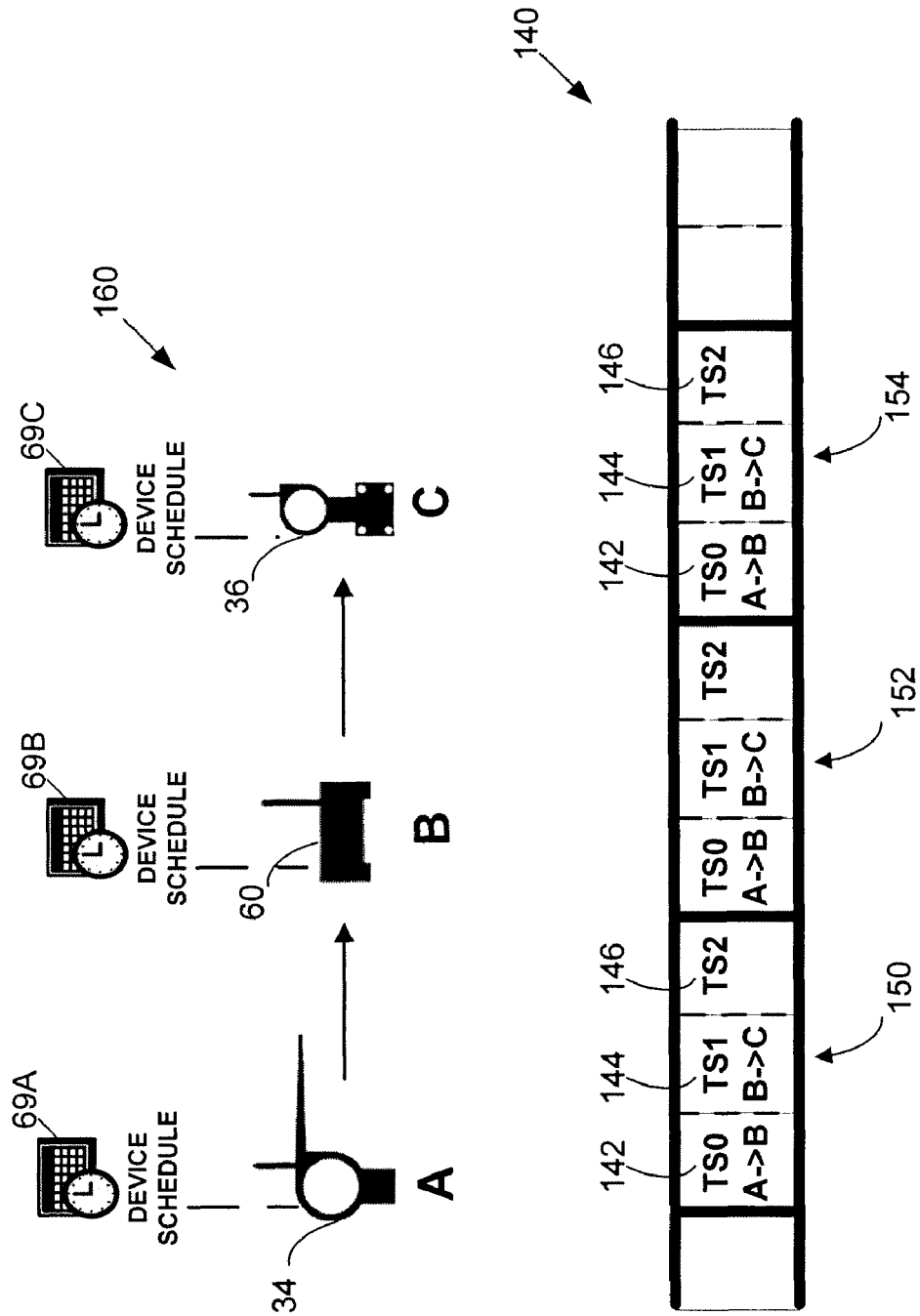
FIG. 4 is a block diagram that illustrates an exemplary association of timeslots of a three-slot superframe with several communicating devices.

FIGS. 3-6 provide a more detailed illustration of channel and timeslot resource allocation supported by the data link layer 76 and the network layer 78 of the WirelessHART protocol 70. As discussed above in reference to FIG. 1, the network manager 27 may manage the definition of one or more superframes and may associate individual timeslots within each of the defined superframes with one of the available channels (e.g., carrier frequencies). By way of one specific example, FIG. 3 illustrates a possible communication scheme within an individual timeslot, while FIG. 4 illustrates an example data exchange between several devices using the timeslots of a certain superframe. Next, FIG. 5 illustrates a possible association between an example timeslot and several available channels, and FIG. 6 is a schematic representation of several concurrent superframes which include the timeslots illustrated in FIGS. 3-5.

Referring specifically to FIG. 3, two or mode network devices may exchange data in a timeslot 100, which may be a dedicated timeslot shared by one transmitting device and one receiving device or a shared timeslot having more than one transmitter and/or one or more receivers. In either case, the timeslot 100 may have a transmit schedule 102 and a receive schedule 104. In other words, one or more transmitting devices may communicate within the timeslot 100 according to the transmit timeslot schedule 102 while one or more receiving devices may communicate within the timeslot 100 according to the receive timeslot schedule 104. Of course, the timeslot schedules 102 and 104 are substantially precisely synchronized and begin at the same relative time 106. Over the course of the timeslot 100, a transmitting network device sends a predetermined amount of data over a communication channel such as a carrier radio frequency. In some cases, the transmitting network device may also expect to receive a positive or negative acknowledgement within the same timeslot 100.

Thus, as illustrated in FIG. 3, the transmit timeslot schedule 102 may include a transmit segment 110 for transmitting outbound data, preceded by a pre-transmission segment 112, and may include a receive segment 122 for receiving an acknowledgement for the data transmitted during the segment 110. The transmit segment 110 may be separated from the receive segment 122 by a transition segment 116, during which the corresponding network device may adjust the hardware settings, for example. Meanwhile, the receive schedule 104 may include segments for performing functions complementary to those carried out in the segments 112-122, as discussed below.

In particular, the transmitting device may send out the entire packet or stream segment associated with a capacity of the timeslot 100 during the segment 110. As mentioned above, the network schedule 67 may include shared timeslots which do not exclusively belong to an individual device schedule 69 of one of the network devices 25 and 30-55. For example, a shared timeslot may have a dedicated receiver such as the gateway device 22 but no single dedicated transmitter. When necessary, one of the network devices 25-60 may transmit unscheduled information, such as a request for additional bandwidth, over the shared timeslot. In these cases, the potentially transmitting device may check whether the shared timeslot is available by performing Clear Channel Assessment (CCA) in a pre-transmission segment 112. In particular, the transmitting network device may listen to signals propagated over the communication channel associated with the timeslot 100 for the duration of the pre-transmission segment 112 to confirm that no other network device is attempting to use the timeslot 100.

On the receiving end of the timeslot 100, the receiving device may receive the entire packet associated with the timeslot 100 within a packet receive segment 114. As illustrated in FIG. 3, the packet receive segment 114 may begin at an earlier point in time than the transmit segment 110. Next, the transmit timeslot schedule 102 requires that the transmitting device transition the radio mode in a transition segment 116. Similarly, the receive timeslot schedule 104 includes a transition segment 118. However, the segment 116 may be shorter than the segment 118 because the transmitting device may start listening for acknowledgement data early to avoid missing a beginning of an acknowledgement.

Still further, the transmit schedule 102 may include an acknowledgement receive segment 122 during which the transmitting device receives an acknowledgement transmitted during an acknowledgement transmit segment 124 associated with the receive schedule 104. The transmitting device may delete the packet transmitted during the transmit segment 110 from an associated transmit queue upon receiving a positive acknowledgement. On the other hand, the transmitting device may attempt to re-transmit the packet in the next scheduled dedicated timeslot or in the next available shared timeslot if no acknowledgement arrives or if the acknowledgement is negative.

Several timeslots 100 discussed above may be organized into a superframe 140, as schematically illustrated in FIG. 4. In particular, the superframe 140 may include a (typically) infinite series of superframe cycles 150-154, each cycle including a set if timeslots, illustrated in FIG. 4 as a timeslot 142 with a relative timeslot number 0 (TS0), a timeslot 144 with a relative timeslot number 1 (TS1), and a timeslot 146 with a relative timeslot number 2 (TS2). Accordingly, the size of the superframe 140 of FIG. 4 is three timeslots. In other words, each of the timeslots 142-146 of the superframe 140 repeats in time at an interval of two intermediate timeslots. Thus, for a 10 millisecond timeslot, the interval between the end of a timeslot with a particular relative slot number and the beginning of a next timeslot with the same relative slot number is 20 milliseconds. Conceptually, the timeslots 142-146 may be further grouped into superframe cycles 150-154. As illustrated in FIG. 4, each superframe cycle corresponds to a new instance of a sequence of timeslots 142-146.

The master network schedule 67 may associate transmission and reception opportunities of some of the network devices participating in the wireless network 14 with particular timeslots of the superframe 140. Referring again to FIG. 4, a network fragment 160 schematically illustrates a partial communication scheme implemented between the network devices 34, 60, and 36 of FIG. 1. To simplify the illustration of the superframe 140, the network devices 34, 60, and 36 are additionally designed in FIG. 4 as nodes A, B, and C, respectively. Thus, according to FIG. 4, the node A transmits data to the node B which, in turn, transmits data to the node C. As discussed above, each of the nodes A-C includes a device schedule 69A-C, which specifies the timeslots and channels (e.g., radio carrier frequencies) for transmitting and receiving data at the corresponding device. The master network schedule 67 may include part of all of the data information stored in the individual device schedules 69A-C. More specifically, the network manager 27 may maintain the master network schedule 67 as an aggregate of the schedules associated with each of the network devices 25A-B and 30-50, including the device schedules 69A-C.

In this example, the duration of the timeslot 100 (FIG. 3) may be 10 milliseconds and the network device A may report data to the device C every 30 milliseconds. Accordingly, the network manager 27 may set the length of the superframe 140 at three timeslots specifically in view of the update rate of the network device A. Further, the network manager 27 may assign the timeslot 142 with a relative number 0 (TS0) to the network devices A and B, with the device A as the transmitter and the device B as the receiver. The network manager 27 may further allocate the next available timeslot 144, having the relative slot number 1 (TS1), to be associated with the transmission from the device B to the device C. Meanwhile, the timeslot 146 remains unassigned. In this manner, the superframe 140 provides a scheme according to which the network manager 27 may allocate resources in the network fragment 160 for the transmission of data from the device A to the device C in view of the available wireless connections between the devices A, B, and C.

In the example illustrated in FIG. 4, the network device at node A may store information related to the timeslot 142 as part of its device schedule 69A. Similarly, the network device at node B may store information related to the timeslots 142 (receive) and 144 (transmit) as part of its device schedule 69B. Finally, the network device C may store information related to the timeslot 144 in the device schedule 69C. In at least some of the embodiments, the network manager 27 stores information about the entire superframe 140, including an indication that the timeslot 146 is available.

Importantly, the superframe 140 need not be restricted to a single radio frequency or other single communication channel. In other words, the individual timeslots 142-146 defining the superframe 140 may be associated with different radio frequencies on a permanent or floating basis. Moreover, the frequencies used by the various devices need not always be adjacent in the electromagnetic spectrum. In one embodiment, for example, the timeslot 142 of each of the superframe cycles 150-154 may be associated with a carrier frequency $F_1$ and the timeslot 144 of each of the superframe cycles 150-154 may be associated with a carrier frequency $F_2$, with the frequencies $F_1$ and $F_2$ being adjacent or non-adjacent in the electromagnetic spectrum.

In another embodiment, at least some of the timeslots 142-146 may move about the allocated frequency band in a predefined manner. FIG. 5 illustrates an example association of the timeslot 144 of FIG. 4 with channels 172-179 (corresponding to frequency sub-bands $F_1$-$F_5$) in the available frequency band 170. In particular, each of the channels 172-179 may correspond to one of the center frequencies $F_1, F_2, \ldots F_5$ which preferably differ from their respective neighbors by the same offset. The channels 172-179 preferably form a continuous section of the spectrum covering the entire available frequency band 170, although the channels 172-179 need be contiguous or form a continuous band in all embodiments. The superframe 140 may use at least a portion of the frequency band 170, so that one or more of the timeslots 142-146 are scheduled on different carrier frequencies in at least two consecutive cycles.

As illustrated in FIG. 5, the timeslot 144 may use the channel 176 (frequency $F_3$) during the frame cycle 150, may use the channel 174 (frequency $F_4$) during the frame cycle 152, and may use the channel 178 (frequency $F_2$) during the frame cycle 154. The timeslot 144 may then "return" to the channel 176 in the next superframe cycle 150A, which may similar to the cycle 150. Each of the specific associations of the timeslot 144 with one of the channels 172-179 is illustrated as a timeslot/channel tuple 144A-C. For example, the tuple 144A specifies the timeslot 2 scheduled, in the cycle 150, on the channel 176 associated with the center frequency $F_3$. Similarly, the tuple 144B specifies the timeslot 2 scheduled, in the cycle 152, on the channel 174 associated with the center frequency $F_4$. Meanwhile, the channel 172 associated with the center frequency $F_5$ may not be assigned to the timeslot 2 during any of the cycles 150-152. However, a different timeslot of the superframe 140 such as the timeslot 146, for example, may be associated with the channel 172 during one or more of the cycles 150-152.

In this example, the frequency assignment associated with the superframe cycle 150 may repeat immediately following the cycle 154 (illustrated as a cycle 150A in the FIG. 5), and the timeslot 144 may again correspond to the tuple 144A after two cycles of the superframe 140. Thus, the timeslot 144 may regularly cycle through the channels 176, 174, and 178. It will be appreciated that the timeslot 144 may similarly cycle through a greater or smaller number of channels irrespective of the length of the superframe 140, provided, of course, that enough channels are available in the frequency band 170. The association of a single timeslot with multiple channels during different superframe cycles, discussed above with respect to FIG. 5 and referred to herein as "channel hopping," significantly increases the reliability of the wireless network 14. In particular, channel hopping reduces the probability that a pair of devices, scheduled to communicate in a particular timeslot of a certain superframe, fail to transmit and receive data when a certain channel is jammed or otherwise unavailable. Thus, for example, the failure of the channel 174 prevents the devices using the timeslot 144 from communicating in the frame cycle 152 but not during the frame cycles 150 or 154.

Referring again to FIG. 4, the device schedules 69B and 69C may include the information regarding each of the tuples 144A-C discussed above in reference to FIG. 5. In particular, each of the device schedules 69B and 69C may store an assignment of the timeslot 144 to one of the channels 172-179 within each of the cycles 150-152. The master network schedule 67 (FIG. 1) may similarly include this information. Meanwhile, the device schedule 69A need not necessarily include the information related to the timeslot 144 because the corresponding node A (the device 34) does not communicate during the timeslot 144 of the superframe 140. In operation, the devices 60 and 36 corresponding to the nodes B and C may prepare for data transmission and reception, respectively, at the beginning of each timeslot 144. To determine whether the timeslot 144 currently corresponds to the tuple 144A, 144B, or 144C, the devices 60 and 36 may apply a locally stored copy of the ASN counter 68 to determine whether the timeslot 144 is currently in the frame cycle 150, 152, or 154.

In the process of defining the network schedule 67, the network manager 27 may define multiple concurrent superframes in view of the update rates of the network devices 25 and 35-50. As illustrated in FIG. 6, the network schedule 67 may include the superframe 140 of length three as well superframes 190 and 192. The superframe 190 may be a five-slot superframe and the superframe 192 may be a four-slot superframe, although the different superframes may have a different number of slots and various different superframes may have the same number of slots. As illustrated in FIG. 6, the superframes need not necessarily align with respect to the relative slot numbers. In particular, at a particular time 194, the superframe 190 may schedule the timeslot with the relative number two (TS2) while the superframes 140 and 192 may schedule the timeslots with the relative number one (TS1). Preferably, the superframes 140, 190, and 192 are time-synchronized so that each transition to a new timeslot within each of these superframes occurs at the same time.

Each of the superframes 140, 190 and 192 may be primarily associated with, or "belong to" an individual one of or a subset of the network devices 25A-B and 30-50. For example, the superframe 140 illustrated in FIG. 4 may belong to the node A (i.e., the network device 34), and the length of the superframe 140 may be advantageously selected so that the node A sends out measurement data to the node B during the timeslot 142 (TS0) once during each of the cycles 150-154. In case the wireless network 14 defines 10 millisecond timeslot, the node A sends data to the node B once every 30 milliseconds. If, however, the node A is reconfigured to report measurements once every 50 milliseconds, the network manager 27, alone or in cooperation with the node A, may reconfigure the frame 140 to have a length of five timeslots instead. In other words, the length of each superframe may reflect a particular transmission requirement of a particular network device 25A-B or 30-50.

On the other hand, more than one network device 25A-B or 30-50 may use a superframe for transmitting or receiving data. Referring again to FIG. 4, the node B (the network device 60) may regularly transmit data to the node C (the network device 36) in the timeslot 144 of the superframe 140, although the superframe 140 may be primarily associated with the node A. Thus, different timeslots of a particular superframe may be used by different network devices to originate, route, or receive data. In a sense, the timeslots of each superframe may be understood as a resource allocated to different devices, with a particular priority assigned to the device that "owns" the superframe. Further, it will be appreciated that each network device may participate in multiple superframes. For example, the network device 34 in FIG. 4 may route data on behalf of other network devices (e.g., the network device 32 illustrated in FIG. 1), in addition to propagating its own data via the router device 60. Preferably, a device participating in multiple superframes does not schedule simultaneous communications in different superframes. While only three superframes are illustrated in FIG. 6, the wireless network 14 of FIG. 1 may include any number of superframes, with each of the different superframes having any desired or useful length based on the types and frequencies of communication being performed in or between particular devices and set of devices.

As indicated above, the ASN counter 68 (see FIG. 1) may reflect the total number of timeslots consecutively scheduled since the activation of the wireless network 14. In other words, only those timeslots which occur following another timeslot affect the ASN count, and the number of concurrently scheduled superframes has no impact on the ASN value. To further outline the operation of the ASN counter 68, FIG. 7 illustrates a schedule 250 including several concurrent superframes 252-256 created at or after a network start time 260. The superframe 252 may be a four-timeslot superframe in which the relative slot numbers iterate from zero to three. Similarly, the superframe 254 may similarly start at the network start time 260 but include eight timeslots numbered zero through seven. On the other hand, the superframe 256 may be created at a later time when a new network device joins the wireless network 14, for example, or when the network manager 27 allocates temporary resources for a special purpose such as to accommodate a block mode transfer. The values which the network manager 27 may assign to the ASN counter 68 during the operation of the network schedule 250 are generally indicated as a sequence 270. It will be noted that the value of the ASN counter 68 increases with every new timeslot irrespective of a superframe with which the timeslot is associated.

Referring back to FIG. 1, each of the network devices 25A-B and 30-50 may maintain a local copy of the ASN counter 68. During operation of the wireless network 14, the gateway device 22 may propagate the current value of the ASN counter 68 to each network device 25A-B or 30-50 for network synchronization. Every network device 25A-B or 30-50 may then compare a local copy of the ASN counter to the value reported in a data packet sent by the gateway device 22 and, if necessary, update the local copy to match the value of the ASN counter adjusted according to a propagation delay of the message. For example, the network schedule 67 may specify that the network node 32 receives a certain type of a data packet, originated by the gateway device 22 and associated with a particular superframe, in a third timeslot following the timeslot in which the gateway device 22 transmits the packet to a neighbor device. The network node 32 may accordingly check whether the current ASN value stored by the network node 32 is indeed the value of ASN included in the data packet plus three (i.e., the number of timeslots scheduled since the gateway device 22 sent out the data packet).

It will be further noted that by propagating ASN information along multiple paths to each network device 25A-B and 30-50 (FIG. 1), the wireless network 14 ensures that as some of the direct wireless connections 65 encounter obstacles or fail for other reasons, the network device 25A-B and 30-50 typically have at least one more access to synchronization information, thus increasing the stability of the wireless network 14 and improving its overall resilience.

Additionally or alternatively, the network devices 25A-B and 30-50 also use the ASN value included in a data packet for ascertaining an age of the data packet. For example, a destination network node may receive a data packet, subtract the ASN inserted into the data packet at the originating network node from the local copy of the ASN value, and calculate the age of the data packet by multiplying the difference in the number of timeslots by the duration of an individual timeslot. It will be noted that by relying on the ASN value included in data packet, the wireless network 14 may enforce time-to-live (TTL) requirements, perform network diagnostics, collect delivery delay statistics, etc.

In some embodiments, every message between a pair of neighbor devices may include the ASN value in a Network Protocol Data Unit (NPDU). If the wireless network 14 uses the WirelessHART protocol 70 schematically illustrated in FIG. 2, each frame associated with the layer 78 may include the ASN value to ensure that the neighbors sharing a direct wireless connection 65 are properly synchronized. In one particular embodiment, each network device 25A-B or 30-50 may include only a portion of the ASN value in an NPDU frame to reduce the amount of data transmitted at the level of the network layer protocol. More specifically, the wireless network 14 may maintain a 32-bit ASN value but the corresponding ASN snippet may include only the lower 16 bits of the ASN value. It will be appreciated that because a typical message is delivered within a seconds or even milliseconds, several lower bits of the ASN value may be sufficient to measure the TTL value. Of course, other embodiments may use an even smaller snippet.

Further, the network devices 25A-B and 30-50 may use the ASN value to determine a current timeslot in a particular superframe. In some embodiments, these devices may apply the following function to calculate a relative slot number within a superframe:

relative slot number=ASN %(length of the superframe), where the symbol "%" represents the modulo division function. A network device 25A-B or 30-50 may use this formula to construct an ordered list of the timeslots that are about to occur in the relevant superframes. It will be noted that in some embodiments, each new superframe of a certain length may start at such a time as to fit an integer number of superframes of this length between this time and the start time of the network. Referring again to FIG. 7, for example, the superframe 256 may have eight timeslots and may accordingly start a timeslot 0, 8, 16, . . . , 8*n*, where n is an integer. In other embodiments, new superframes may not start at an ASN value equal to a multiple of the superframe length, and the joining device may add an additional offset to a result of applying the formula above.

In another embodiment, the devices attempting to join the wireless network 14 may use the ASN value to properly synchronize with the activate network schedule 67. In particular, each active network device 25A-B and 30-50 may periodically sent out advertisement packets which the potential new neighbors of these devices may process to determine whether one or more new direct wireless connections 65 may be formed between the joining device and one more of the advertising devices. In addition to evaluating the strength and, optionally, the quality of a signal associated with each advertising (potential) neighbor, the joining device may consider a number of other factors when processing advertisement packets. For example, each advertisement packet may include a network identity field which the joining device may compare to the network identity with which the joining device has been previously provisioned. This process may ensure that the joining device joins the correct network if several similar wireless networks 14 operate within a short distance from each other or if there is some overlap between the geographical areas covered by these networks.

Referring to FIG. 8, a state diagram 300 illustrates some of the representative states associated with a network protocol layer of a network device participating in the wireless network 14. The network device may enter the state 302 immediately upon power-up and remain in the idle state 302 until receiving a command to initiate a join sequence. In the state 302, the network device may not be provisioned to communicate with any other devices of the wireless network 14. In at least some of the embodiments, an operator may provision or otherwise communicate with the network device via a maintenance port.

Referring to FIG. 8, a state diagram 300 illustrates some of the representative states associated with a network protocol layer of a network device participating in the wireless network 14. It will be noted that the state diagram 300 corresponds to a particular embodiment of a network device 25A-B or 30-50 and that in other embodiments the corresponding state machine may combine certain states illustrated in FIG. 8 together or, conversely, implement more states responsive to fewer or more transition events. Further, one of ordinary skill in the art will appreciate that a network device 25A-B or 30-50 may implement multiple concurrent state machines associated with different operational modes, sessions, network layers, etc., and that some contemplated embodiments may associate some of the operations illustrated in the state diagram 300 with other protocol layers, for example.

As illustrated in FIG. 8, the network device may enter the state 302 immediately upon power-up and remain in the idle state 302 until receiving a command to initiate a join sequence. In the state 302, the network device may not be provisioned to communicate with any other devices of the wireless network 14. In at least some of the embodiments, an operator may provision the network device with one or more security keys, network identity, and or other configuration data via a maintenance port.

In a joining state 304, the network device may begin to listen for advertisement messages and attempt to locate the wireless network 14 by comparing the network identity reported in the advertisement messages to the network identity value with which the network device has been provisioned. In particular, a join procedure may begin with the network device selecting a particular radio channel and starting to listen for advertisement packets. This mode of operation may be called a promiscuous mode. If the network device does not receive an advertisement packet within a certain amount time (e.g., four timeslots, one second, etc.), the join procedure may select a different radio channel for another iteration. If, on the other hand, the network device receives an advertisement packet, the join procedure may process the packet and either accept the advertisement or return to the promiscuous mode and listen for additional advertisement packets. In an alternate embodiment, the join procedure may accumulate a certain number of advertisement packets prior to selecting the best candidate from the accumulated set.

In evaluating advertisement packets, the network device may consider several factors such as the strength of a signal transmitted by a potential neighbor device, for example. Because it may not be desirable to define a link that has poor signal quality, or because a network device may have several choices with respect to selecting one or more neighbors, it may be desirable to consider the signal strength as one of the factors in defining routes through graph or source routing as well as in defining schedules. More specifically, the network device may calculate a received signal strength indication (RSSI) which is indicative of the energy, not quality of the signal. To arrive at the RSSI value, the network device may measure received signal level (RSL) which may be expressed in decibels of the detected signal. Alternatively, the network device may choose the traditional approach of measuring the quality, and not the strength, of the signal. It some embodiments, the network device may report signal strength measurements to the network manager 27 and may then wait for to receive superframe, graph, and link configuration from the network manager 27. In these embodiments, the network manager 27 may further consider such factors during graph and schedule formation as the projected number of hops, projected amount of traffic traveling through each node, power capability at each node, and the resulting latency for each type of traffic, etc.

By processing advertisement messages, the network device may also synchronize with the wireless network 14 and update a local copy of the ASN counter 68. Once synchronization is complete, the network device may forward a request for admission into the wireless network 14 to the network manager 27. To this end, the network device may extract the information regarding an available join session from one or more advertisement packets.

Next, the network manager 27 may also perform one or more authentication procedures to ensure that the network device is properly authorized to participate in the wireless network 14. With continued reference to FIG. 8, the network device may operate in a quarantined state 306 until the network manager 27 or an external application fully approves the newly joined network device. The network device may perform limited functions in the wireless network 14 while in the quarantined state 306. For example, the network device may not be allowed to forward data packets originated by peer network devices 25A-B or 30-50 until allowed to transition to an operational state 308.

In the operational state 308, the network device may fully participate in all network operations such as interacting with the gateway 22 to provide access to an external application to various operational parameters of the network device, negotiate bandwidth for publishing scheduled process data and/or unscheduled data in a block transfer mode, and sending out advertisement packets to invite new wireless devices to join the wireless network 14, for example. As indicated above, the network device may also be allowed to route data between peer network devices 25A-B or 30-50 in the operational state 308.

At some during the operation of the wireless network 14, the gateway device 22 may receive an indication from the outside network that there may be an explosive, radio-sensitive device in the vicinity of one or more wireless network devices 25A-B or 30-50. The gateway device 22 may forward this indication to the network manager 27 which, in turn, may broadcast a suspend message requesting suspension of all communications in the wireless network 14. Alternatively, the gateway device 22 may support a suspend command on the wired interface connecting the gateway device 22 to the plant automation network 12. A properly authorized operator may use the workstation 16, for example, to suspend the wireless network 14 by directing a certain command to the network manager 27 directly or via the gateway device 22.

In some embodiments, the suspend command may be a broadcast message carrying the same information from the network manager 27 or the gateway device 22 to every network device 25A-B and 30-50. The broadcast suspend command may specify, for example, the time at which the communications should stop and, optionally, the time at which the communications should resume. Alternatively, the suspend command may specify the time at which the wireless communications should stop and a duration of quiet time during which the communications are not allowed to resume. As yet another alternative, each network device 25A-B or 30-50 may start a timer upon receiving the suspend command and resume communications when the time expires. For example, each network device 25A-B or 30-50 may be preconfigured to suspend communications for five seconds after receiving the suspend command. Of course, some of the network device 25A-B or 30-50 may also be configured with different timeout values depending on the device type, for example. As yet another alternative, the timeout value may be proportional to the update rate of the fastest device in the wireless network 14. It will be noted that the suspend command in these embodiments need not specify the time at which the communications should resume.

Some embodiments of the wireless network 14 may also use the suspend command as a unicast or a multicast message. For example, an external host such as the workstation 16 may send to the network manager 27 a reporting specifying a condition which may require radio silence specific to a certain geographical area. In some embodiments, the network manager 27 may be aware of the topology of the wireless network 14 not only schematically (e.g., maintaining a graph based on signal strength, etc.) but also spatially, i.e., in terms of at least approximate physical locations of the network devices 25A-B or 30-50. In these embodiments, the network manager 27 may be able to determine which of the network devices 25A-B and 30-50, if any, are proximate to the geographical area specified in the condition report. The network manager 27 may then suspend communications in a particular portion of the wireless network 14 by sending unicast or multicast suspend commands to the relevant network devices 25A-B and 30-50.

Referring again to FIG. 8, the network device implementing the state machine 300 may transition to a suspended state 310. In this state, the network device may at least suspend radio transmissions. In some embodiments, the network device may also stop listening to incoming data to preserve battery life. However, it is contemplated that in at least one possible implementation, the suspension of transmissions in the wireless network 14 may be indefinite, and the network devices 25A-B and 30-50 may not transmit data until receiving a wake-up command to cancel the suspend command. In this case, the network devices 25A-B and 30-50 may either continue to listen to incoming data at the scheduled rate or at a reduced rate, such as by waking up once every second, for example. In the particular embodiment illustrated in FIG. 8, the network device may start a suspend timer upon a transition into the suspend state 310. If desired, the suspend timer may be the difference between the transmission resume time specified in the suspend message and the current time or, alternatively, a predefined value with which the network device has been provisioned via the maintenance port.

In some embodiments of the wireless network 14, a network device 25A-B and 30-50 may be allowed to forward the suspend command prior to aborting transmissions in compliance with the suspend command. Referring back to FIG. 1, for example, the network device 32 may receive a suspend command broadcast from the network manager 27 via the gateway 22 and forward the suspend command to the network device 60 prior to suspending transmissions at the network device 32. In this particular embodiment, the gateway device 22 may not expect to receive an acknowledgement for the suspend command from each command recipient. On the other hand, if the network manager 27 explicitly specifies the time at which the communications should stop as part of the suspend command, each network device 25A-B and 30-50 may properly respond to the suspend command with a positive or a negative acknowledgement.

Referring still to FIG. 8, the network device may transition from the suspended state 310 to a re-synching state 312 when the suspend timeout expires. As discussed above, the transition to the state 312 could be triggered by an explicit command in some of the alternative embodiments. In the re-synching state 312, the network device may determine the start of a timeslot at the relative time 106 (see FIG. 3) and, once the timeslot timing is determined, the network device may calculate relative slot numbers in or more superframes in which the network device participates. To this end, the network device may apply the modulo division formula presented above, i.e., the network device may calculate the relevant relative slot numbers based on the ASN value. The states 304-312 may therefore include a continual update of the ASN count based on an internal clock of the individual network device. In this sense, the network schedule may advance by the same number of timeslots irrespective of whether one or more network devices 25A-B or 30-50 are in the suspended state 310.

Further with respect to ASN, the suspend command may specify the time at which the communications should stop and/or the time at which the communications should resume in ASN units to reduce the amount of data transmitted in the wireless network 14 and to provide a discrete time scale. Accordingly, each of the network devices 25A-B or 30-50 may measure timeout intervals in ASN units to simplify time-related calculations.

In general, it will be appreciated that a human operator or, in some automated decisions, the network manager 27 may suspend the wireless network 14 in response to detecting conditions other than a blast operation discussed in the example above. For example, an operator may require radio silence because of an unrelated test or due to a highly sensitive measurement performed near one or more network devices 25A-B or 30-50. In short, the suspend command may be used for a variety of purposes and, because of the ability of the wireless network 14 to efficiently resynchronize communications, may have a very limited and controlled impact on the process control environment.

In another aspect, it will be noted that an operator such as a plant technician may use the handheld device 55 to connect to the wireless network 14 and send a suspension request to the network manager 27 which may process the suspension request, optionally verify the operator's authorization with respect to triggering a temporary period of radio silence, and propagate the suspend command through the wireless network 14 in the manner discussed above. Moreover, the operator may use a wired handheld device (not shown) to connect to a wireless adapter such as the WirelessHART adapter 50 and thereby access the wireless network 14. Of course, as discussed above, the operator may similarly issue the same or similar suspension request from outside the wireless network 14.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A method of increasing operational safety of a wireless communication network operating in a process control environment and having a plurality of network devices, comprising:

maintaining an absolute slot number counter indicative of a number of communication timeslots of a predetermined duration scheduled since a formation of the wireless communication network; wherein each of the plurality of network devices communicates with at least one other of the plurality of network devices according to a communication schedule having a plurality of concurrent superframes, each defined as a repeating sequence of timeslots;

detecting a first triggering condition associated with an increased operational risk due to a wireless transmissions by at least one of the plurality of network devices;

sending a suspend command to at least some of the plurality of network devices;

specifying, in the suspend command, a suspend time at which a recipient network device must suspend transmissions, including specifying an absolute slot number;

suspending transmissions at the at least some of the plurality of network devices; and resuming transmissions at the at least some of the plurality of network devices upon occurrence of a second triggering condition.

2. The method of claim 1, wherein sending a suspend command includes specifying, in the suspend command, a resume time at which the recipient network device is allowed to resume transmissions.

3. The method of claim 2, wherein the absolute slot number is a first absolute slot number, and wherein the method further comprises specifying the resume time include specifying a second absolute slot number.

4. The method of claim 1, wherein sending a suspend command includes specifying, in the suspend command, a quiet time interval during which the recipient network device is not allowed to resume transmissions.

5. The method of claim 1, further comprising pre-configuring each of the plurality of network devices with a quiet time interval during which the network device is not allowed to resume communications following a reception of the suspend command.

6. The method of claim 1, wherein sending a suspend command includes broadcasting the suspend command to each of the plurality of network devices from a gateway device connecting the wireless communication network to an external network.

7. The method of claim 6, wherein broadcasting the suspend command from the gateway device includes receiving a suspension request from an external host operating outside the wireless communication network and communicatively coupled to the gateway.

8. The method of claim 6, wherein broadcasting the suspend command from the gateway device includes receiving a suspension request from a handheld device operating in the wireless communication network as one of the plurality of network devices.

9. The method of claim 1, further comprising:
starting a timer at each of the at least of the plurality of network devices to which the suspend command is sent; and wherein
the second triggering condition is an expiration of the timer.

10. The method of claim 1, further comprising:
sending a resume command to the at least some of the plurality of network devices to which the suspend command is sent after a suspension period; wherein
the second triggering condition is a reception of the resume command at the at least some of the plurality of network devices.

11. A method of temporarily suspending communications in a wireless communication network operating in a process control environment and having a plurality of network devices, comprising:
maintaining an absolute slot number counter indicative of a number of communication timeslots of a predetermined duration scheduled since a formation of the wireless communication network;
specifying, in a suspend command, a suspend time at which a recipient network device must suspend transmissions, including specifying an absolute slot number;
sending the suspend command to each of the plurality of network devices;
suspending transmissions at the each of the plurality of network devices;
starting a quiet time timer at the each of the plurality of network devices; and
resuming transmissions at the each of the plurality of network devices upon expiration of the quiet time timer.

12. The method of claim 11, wherein sending a suspend command to each of the plurality of network devices includes sending a suspend command in response to detecting a condition associated with an elevated safety risk due to transmissions by one or more of the plurality of network devices.

13. The method of claim 11, wherein sending a suspend command to each of the plurality of network devices includes sending at least one of a transmission stop time, a transmission resume time, and a quiet time interval; wherein the quiet time interval defines a duration of the quiet time timer.

14. The method of claim 11, further comprising:
defining a network communication schedule of the wireless communication network as a plurality of concurrent overlapping superframes, wherein each of the plurality of concurrent overlapping superframes is a repeating sequence of cycles, each cycle having a number of communication timeslots defining a length of the superframe, each timeslot win each cycle sequentially numbered to have relative slot numbers in a range from zero to the certain number minus one; and
associating wireless communications at each of the plurality of network devices with at least one communication timeslot in at least one of the plurality of concurrent overlapping superframes; wherein
resuming transmissions at each of the plurality of network devices includes synchronizing each of the plurality of network devices with the network communication schedule, including calculating a relative slot number within a corresponding one of the plurality of concurrent overlapping superframe based on the absolute slot number.

15. The method of claim 14, wherein synchronizing each of the plurality of network devices with the network communication schedule includes performing a modulo division of a value of the absolute slot number counter into the length of one of the plurality of concurrent overlapping superframes to obtain a current relative slot number within the one of the plurality of concurrent overlapping superframes.

16. The method of claim 14, wherein suspending transmissions at each of the plurality of network devices includes maintaining the absolute slot number counter at each of the plurality of network devices while the quiet time timer is running.

17. The method of claim 11, wherein starting a quiet time timer at each of the plurality of network devices includes setting a duration of the quiet time timer to a preconfigured value stored at each of the plurality of network devices.

18. A method of temporarily suspending wireless communications in communication network operating in a process control environment and having a plurality of network devices, comprising:
maintaining an absolute slot number counter at each of the plurality of network devices, wherein the absolute slot number counter is indicative of a number of communication timeslots scheduled since the wireless mesh network was formed;
defining a communication schedule having a plurality of links, each link specifying a communication timeslot of a predetermined duration, at least one sender, and at least one receiver, wherein the at least one sender and the at least one receiver are included in the plurality of network devices and wherein each of plurality of network devices communicates according to the communication schedule;
detecting a condition associated with a increase in operational risk of the process control network; and
suspending wireless communications in the wireless mesh network, including transmitting a first broadcast message to each of the plurality of network devices requesting each device to temporarily suspend wireless communications, the first broadcast message including a suspend time corresponding to an absolute slot number at which to temporarily suspend wireless communications.

19. The method of claim 18, wherein defining a communication schedule includes allocating timeslots to each of the field devices according to rates at which the field devices transmit process control or measurement data.

20. The method of claim 18, wherein detecting a condition associated with a increase in operational risk of the process control network includes detecting a condition associated with an elevated risk of explosion in an environment in which the process control network is operating.

21. The method of claim 18, wherein suspending wireless communications includes specifying to each network device a amount of time during which the wireless communications are to be suspended, and wherein each of the plurality of network devices is allowed to resume wireless communications after the specified amount of time.

22. The method of claim 18, further comprising resuming wireless communications in the wireless mesh network, including broadcasting a second message to each of the plurality of network devices requesting each device to resume wireless communications.

\* \* \* \* \*